United States Patent
Bergqvist et al.

(10) Patent No.: US 11,949,608 B2
(45) Date of Patent: *Apr. 2, 2024

(54) BEAM INFORMATION IN EARLY MEASUREMENTS

(71) Applicant: Telefonaktiebolaget LM Ericsson (publ), Stockholm (SE)

(72) Inventors: Jens Bergqvist, Linköping (SE); Icaro L. J. Da Silva, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1 day.

This patent is subject to a terminal disclaimer.

(21) Appl. No.: 17/370,166

(22) Filed: Jul. 8, 2021

(65) Prior Publication Data

US 2021/0344463 A1 Nov. 4, 2021

Related U.S. Application Data

(63) Continuation of application No. 16/945,092, filed on Jul. 31, 2020, now Pat. No. 11,088,793, which is a (Continued)

(51) Int. Cl.
*H04L 5/00* (2006.01)
*H04W 24/10* (2009.01)
(Continued)

(52) U.S. Cl.
CPC .......... *H04L 5/0032* (2013.01); *H04W 24/10* (2013.01); *H04W 56/001* (2013.01);
(Continued)

(58) Field of Classification Search
CPC ... H04W 76/27; H04W 72/21; H04W 72/046; H04W 56/001; H04W 24/10;
(Continued)

(56) References Cited

U.S. PATENT DOCUMENTS

| 2018/0048375 A1 | 2/2018 | Guo et al. |
| 2019/0007906 A1 | 1/2019 | Hessler et al. |

(Continued)

FOREIGN PATENT DOCUMENTS

| CN | 103491523 A | 1/2014 |
| CN | 109309969 A | 2/2019 |

(Continued)

OTHER PUBLICATIONS

Technical Examination Report issued by the Brazilian Federal Public Service, Ministry of Economy, National Institute of Industrial Property for Application No. BR112021014991-0—dated Feb. 11, 2020.

(Continued)

*Primary Examiner* — Brian D Nguyen
(74) *Attorney, Agent, or Firm* — BAKER BOTTS L.L.P.

(57) ABSTRACT

A method for measurement reporting performed by a wireless device includes obtaining a beam measurement configuration from a network. Based on the beam measurement configuration, the wireless device performs at least one beam measurement while operating in a dormant state. The wireless device reports a result of the at least one beam measurement to the network. The reporting is done after a transition from the dormant state to a connected state.

20 Claims, 16 Drawing Sheets

Related U.S. Application Data continuation of application No. PCT/IB2020/051068, filed on Feb. 11, 2020.

(60) Provisional application No. 62/805,602, filed on Feb. 14, 2019.

(51) Int. Cl.
*H04W 56/00* (2009.01)
*H04W 72/04* (2023.01)
*H04W 72/044* (2023.01)
*H04W 72/21* (2023.01)
*H04W 72/541* (2023.01)
*H04W 72/542* (2023.01)

(52) U.S. Cl.
CPC ......... *H04W 72/046* (2013.01); *H04W 72/21* (2023.01); *H04W 72/541* (2023.01); *H04W 72/542* (2023.01)

(58) Field of Classification Search
CPC .............. H04W 72/542; H04W 52/541; H04L 5/0032; H04B 7/0695
See application file for complete search history.

(56) References Cited

U.S. PATENT DOCUMENTS

| | | | |
|---|---|---|---|
| 2019/0014492 A1 | 1/2019 | Kim et al. | |
| 2019/0021052 A1 | 1/2019 | Kadiri et al. | |
| 2019/0037425 A1 | 1/2019 | Hong et al. | |
| 2019/0053320 A1 | 2/2019 | Islam | |
| 2019/0173533 A1 | 6/2019 | Kim | |
| 2019/0254106 A1 | 8/2019 | Wu | |
| 2019/0357069 A1 | 11/2019 | Harada | |
| 2020/0029262 A1 | 1/2020 | Kim | |
| 2020/0037385 A1 | 1/2020 | Park | |
| 2020/0045767 A1* | 2/2020 | Velev | H04W 8/24 |
| 2020/0059285 A1 | 2/2020 | Zhang | |
| 2020/0137602 A1 | 4/2020 | Zhang | |
| 2020/0413279 A1 | 12/2020 | Kim | |
| 2020/0413356 A1 | 12/2020 | Wang | |
| 2021/0007000 A1 | 1/2021 | Kim | |
| 2021/0014818 A9 | 1/2021 | Park | |
| 2021/0045051 A1 | 2/2021 | Kusashima | |
| 2021/0045084 A1 | 2/2021 | Liu | |
| 2021/0274587 A1* | 9/2021 | Jung | H04W 76/27 |
| 2021/0289381 A1* | 9/2021 | Yan | H04W 72/046 |
| 2022/0015131 A1* | 1/2022 | Cheng | H04W 74/04 |
| 2022/0039486 A1* | 2/2022 | Pennington | A41C 3/10 |
| 2022/0078646 A1* | 3/2022 | Xu | H04W 76/15 |

FOREIGN PATENT DOCUMENTS

| | | |
|---|---|---|
| JP | 2018 098783 A | 6/2018 |
| KR | 20190012096 A | 2/2019 |
| RU | 2595552 C1 | 8/2016 |
| WO | 2018 031908 A1 | 8/2017 |
| WO | 2018 075962 A1 | 4/2018 |
| WO | 2018171709 A1 | 9/2018 |
| WO | 2018174489 A1 | 9/2018 |
| WO | 2018 230984 A1 | 12/2018 |
| WO | 2019014003 A1 | 1/2019 |
| WO | 2020 057518 A1 | 3/2020 |
| WO | 2020165751 A1 | 8/2020 |

OTHER PUBLICATIONS

Examination Report No. 1 issued by the Australian Government, IP Australia for Application No. 2020220894—dated Sep. 13, 2021.
Search Report issued by Brazilian National Institute of Industrial Property for BR112021014991-0—dated Jan. 18, 2022.
Office Action Issued by the Republic of Colombia for Ref. File No. NC2021/0009686—dated Mar. 31, 2022.
Russian Office Action issued for Application No. 2021121994/07—dated Apr. 12, 2022.
Samsung, "Beam Refinement Considering RRM Measurement based on Idle Mode RS", 3GPP TSG RAN WG2 #99bis, Prague, Czech Republic, Oct. 9-13, 2017, pp. 1-4, R2-1711602 (Resubmission of R2-1709604), 3GPP—Oct. 9-13, 2017.
Chinese Office Action issued for Application No. 202080014488.7—dated Nov. 29, 2021.
Notice of Reasons for Rejection issued for Japanese Patent Application No. 2021/546876—dated Mar. 8, 2022.
Examination Report No. 1 issued for the Australian Government, IP Australia for Application No. 2020220894—dated Sep. 13, 2021.
3GPP TSG RAN WG1 Meeting #89; Hangzhou, China; Source: AT&T; Title: Measurement based on SS block (R1-1707757)—May 15-19, 2017.
Nokia et al., "Reference signals and measurements for beam management and mobility", 3GPP TSG RAN WG1#89, Hangzhou, P.R. China, May 15-19, 2017, pp. 1-6, R1-1708904, 3GPP.
Qualcomm Incorporated, "UE Power Consumption Reduction in RRM Measurements", 3GPP TSG-RAN WG1 Meeting 1901, Taipei, Taiwan, Jan. 21-25, 2019, pp. 1-13, R1-1900913, 3GPP.
Korean Office Action issued by the Korean Intellectual Property Office for Application No. 10-2021-7029049—dated Jan. 3, 2022.
3GPP TSG-RAN WG2 #101; Athens, Greece; Source: Nokia, Nokia Shanghai Bell; Title: Remaining details of New SCell state (R2-1802755)—Feb. 26-Mar. 3, 2018.
PCT Notification of Transmittal of the International Search Report and the Written Opinion of the International Searching Authority, or the Declaration issued for International application No. PCT/IB2020/051068—dated May 4, 2020.
Intel Corporation, "TS36.331 CR on [103bis#43][LTEeLTE] Capture NR agreements", 3GPP TSG-RAN WG2 Meeting #104, Spokane, USA, Nov. 12-16, 2018, pp. 1-49, R2-1819197, 3GPP.
Examination Report issued by Intellectual Property India for Application No. 202117030718—dated Mar. 2, 2022.

* cited by examiner

Note: The action of moving to Dormant is called "Hybernation"

BEAM INFORMATION IN EARLY MEASUREMENTS

PRIORITY

This application is a continuation, under 35 U.S.C. § 120 of U.S. patent application Ser. No. 16/945,092 filed on Jul. 31, 2020, now U.S. Pat. No. 11,088,793, which is a continuation under 35 U.S.C. 111(a) of co-pending International Patent Application Serial No. PCT/IB2020/051068 filed Feb. 11, 2020 and entitled "BEAM INFORMATION IN EARLY MEASUREMENTS" which claims priority to U.S. Provisional Patent Application No. 62/805,602 filed Feb. 14, 2019 both of which are hereby incorporated by reference in their entirety.

TECHNICAL FIELD

The present disclosure relates, in general, to wireless communications and, more particularly, systems and methods for beam information in early measurements.

BACKGROUND

In Rel-10, Carrier Aggregation (CA) was introduced in Long-Term Evolution (LTE) to enable the user equipment (UE) to transmit and/or receive information via multiple cells, which may be called Secondary Cells (SCells, from multiple carrier frequencies, to the benefit of the existing of non-contiguous and contiguous carriers. In CA terminology, the Primary Cell (PCell) is the cell towards which the UE established the Radio Resource Control (RRC) connection or did handover to. In CA, cells are aggregated on Medium Access Control-level (MAC-level). Medium Access Control (MAC) gets grants for a certain cell and multiplexes data from different bearers to one Transport Block being sent on that cell. Also, MAC controls how that process is done.

FIG. 1 illustrates multiple Packet Data Convergence Protocols (PDCPs) and Radio Link Controls (RLCs) connected to multiple cells (e.g., Cell1, Cell2, and Cell3) via a MAC layer.

SCells can be added or configured for the UE using RRC signaling such as, for example, a RRCConnectionReconfiguration message, which takes in the order of 100s of milliseconds. A cell that is configured for the UE becomes a serving cell for this UE. An SCell may also be associated to an SCell state. When configured/added via RRC, an SCell starts in a deactivated state. In LTE Rel-15, an eNB can indicate to the UE to activate-upon-configuration, or change the state, at least in RRCReconfiguration.

FIG. 2 illustrates the possible states for a cell as discussed in LTE Rel-15. Specifically, in LTE rel-15, a new intermediate state between the deactivated and active state has been introduced for enhanced uplink operation. This state is the dormant state and has not yet been introduced in New Radio (NR). The action of moving into a dormant state is called hibernation.

A MAC Control Element (MAC CE) can be used to change the SCell state between the deactivated, activated, and dormant states. There are also timers in MAC to move a cell between deactivated, activated, and dormant states. These timers are:
  sCellHibernationTimer; which moves the SCell from activated state to dormant state,
  sCellDeactivationTimer; which moves the SCell from activated state to deactivated state
  dormantSCellDeactivationTimer; which moves the SCell from dormant state to deactivated state
The MAC level SCell activation takes in the order of 20-30 ms.

Once the network understands the need to configure and/or activate CA, the question is which cells to initially configure and/or activate, if they are configured, and/or whether a cell/carrier is good enough in terms of radio quality/coverage such as, for example, RSRP and RSRQ. To understand the conditions on SCell(s) or potential SCell(s) in a given available carrier the network may configure the UE to perform Radio Resource Management (RRM) measurements.

Typically, the network may be assisted by RRM measurements to be reported by a UE. The network may configure the UE with measurement IDs associated to reportConfig with event A1 (serving cell becomes better than threshold) in case this is a configured SCell, or A4 (neighbour cell becomes better than threshold) for carriers without a configured SCell. The measurement objects are associated to the carrier the network wants reports on. If the network is aware of the exact cells it wants the UE to measure, a white cell list can be configured in the measurement object so that the UE is only required to measure these cells in that carrier.

FIG. 3 illustrates a signaling flow diagram for reconfiguration of a UE in RRC_Connected after the Master Node (MN) makes the decision to set up CA and/or Dual Connectivity (DC). Specifically, the MN sends a RRCReconfiguation message, which is a measConfig with for example, A4. After a period of time equal to the time it takes to get the first measurement reports, the UE sends a RRCMeasurementReport for carriers and cells. The MN then makes a decision for SCell addition or SCell activation based on the RRCMeasurementReport and transmits a RRCReconfiguration message to the UE.

With the later introduction of DC in Rel-12, it was possible to add what is called Secondary Cell Group (SCG) configuration to the UE. The main benefit is that the UE could in principle add a cell from another eNodeB. Protocol wise, that would require different MAC entities, one for each cell group. The UE will have two cell groups, one associated to the PCell (master node) and another associated to a PScell (of the secondary eNodeB), where each group may possibly have their own associated SCells.

When it comes to adding SCells, when the UE is in single connectivity the RRCConnectionReconfiguration message may carry a cell index (so MAC identifiers are optimized, i.e., shorter), cell identifier and carrier frequency, common parameters, and, state information, later introduced in Rel-15 (activated or dormant). 5G in 3GPP introduce both a new core network (5GC) and a new Radio Access Network (NR). The core network, 5GC, will however, also support Radio Access Technologies (RATs) other than NR. It has been agreed that LTE or Evolved-Universal Terrestrial Radio Access (E-UTRA) should also be connected to 5GC. LTE base stations, such as eNBs, that are connected to 5GC are called ng-eNB and are part of NG-RAN which also consist of NR base stations called gNBs. FIG. 4 illustrates the 5GS Architecture containing 5GC and NG-RAN. Specifically, FIG. 4 shows how base stations are connected to each other and the nodes in 5GC.

There are different ways to deploy 5G network with or without interworking with LTE (also referred to as E-UTRA) and evolved packet core (EPC. FIG. 5 illustrates LTE and NR interworking options. In principle, NR and LTE can be deployed without any interworking, denoted by NR stand-alone (SA) operation. That is, gNB in NR can be connected to 5G core network (5GC) and eNB can be connected to EPC with no interconnection between the two, as shown in Option 1 and Option 2 in FIG. 5. On the other hand, the first supported version of NR is E-UTRAN-NR Dual Connectivity (EN-DC), which is illustrated as Option 3. In such a deployment, DC between NR and LTE is applied with LTE as the master and NR as the secondary node. The RAN node, which may include a gNB supporting NR, may not have a control plane connection to core network (EPC), instead it relies on the LTE as master node (MeNB). This is also called Non-standalone NR. In this case, the functionality of an NR cell is limited and would be used for connected mode UEs as a booster and/or diversity leg, but an RRC_IDLE UE cannot camp on these NR cells.

With introduction of 5GC, other options may also be valid. As mentioned above, Option 2 supports stand-alone NR deployment where gNB is connected to 5GC. Similarly, LTE can also be connected to 5GC using Option 5, which is also known as eLTE, E-UTRA/5GC, or LTE/5GC, and the node may be referred to as an ng-eNB. In these cases, both NR and LTE are seen as part of the NG-RAN, and both the ng-eNB and the gNB may be referred to as NG-RAN nodes). It is worth noting that, Option 4 and Option 7 are other variants of DC between LTE and NR which will be standardized as part of NG-RAN connected to 5GC, denoted by Multi-Radio Dual Connectivity (MR-DC). Under the MR-DC umbrella, we have:

EN-DC (Option 3): LTE is the master node and NR is the secondary (EPC CN employed)
NE-DC (Option 4): NR is the master node and LTE is the secondary (5GCN employed)
NGEN-DC (Option 7): LTE is the master node and NR is the secondary (5GCN employed)
NR-DC (variant of Option 2): Dual connectivity where both the master and secondary are NR (5GCN employed).

As migration for these options may differ from different operators, it is possible to have deployments with multiple options in parallel in the same network. For example, there could be an eNB base station supporting Options 3, 5 and 7 in the same network as an NR base station supporting Options 2 and 4. In combination with DC solutions between LTE and NR it is also possible to support CA in each cell group (i.e. MCG and SCG) and dual connectivity between nodes on same RAT (e.g. NR-NR DC). For the LTE cells, a consequence of these different deployments is the co-existence of LTE cells associated to eNBs connected to EPC, 5GC, or both EPC/5GC.

A very typical scenario/use case is a UE with some burst traffic that comes and goes. For example, the UE may send or receive some video packets, experience idle periods of transmission/reception, and then come live again. To save UE power, the network transitions the UE from connected to idle during these periods. Then, the UE comes back again, either via paging or UE request to get connected, and accesses the network.

In LTE Rel-13, a mechanism was introduced for the UE to be suspended by the network in a suspended state similar to RRC_IDLE but with the difference that the UE stores the Access Stratum (AS) context or RRC context. This makes it possible to reduce the signaling when the UE is becoming active again by resuming the RRC connection, instead of as prior to establish the RRC connection from scratch. Reducing the signaling could have several benefits:

Reduce latency e.g. for smart phones accessing Internet
Reduced signaling leads to reduce battery consumption for machine type devices sending very little data.

The Rel-13 solution is based on that the UE sends a RRCConnectionResumeRequest message to the network and in response may receive an RRCConnectionResume from the network. The RRCConnectionResume is not encrypted but integrity protected.

The resume procedure in LTE can be found in the RRC specifications such as 3GPP TS 36.331. As the UE performing resume is in RRC_IDLE (with suspended AS context), that triggers a transition from RRC_IDLE to RRC_CONNECTED.

Thus, that is modelled in the specifications in the same subclause that captures the RRC connection establishment (subclause 5.3.3 RRC connection establishment). There are few things relevant to highlight in the SCG configurations and SCell configurations for MCGs in relation to suspend/resume procedures. Upon suspension, it is defined that the UE stores its used RRC configuration. In other words, if the UE is operating in any DC mode and has an SCG configuration or if the UE just has configured SCells in the MCG, it shall store all these configurations. However, upon resume, at least until Rel-15, it is defined that the UE shall release the SCG configurations and SCell configurations. Hence, when the UE comes from RRC_IDLE with the context, if the network wants to add SCell(s) to the MCG or add an SCG, it needs to do that from scratch, even if the UE is suspending and resuming in the same cell/area where all the previous PCell and SCell configurations are still valid from a radio conditions perspective.

As the use case of UEs with burst traffic constantly being suspended and resuming in the same cell is quite typical, 3GPP has standardized a solution in LTE to enable the UE to assist the network with measurements performed while the UE is in RRC_IDLE so that the network could speed up the setup of carrier aggregation or dual connectivity. Specifically, in LTE Rel-15, it is possible to configure the UE to report so called early measurements upon the transition from idle to connected state. These measurements are measurements that the UE can perform in idle state, and according to a configuration provided by the source cell with the intention to receive these measurements immediately after the UE gest connected and quickly setup CA and/or other forms of DC (e.g. EN-DC, MR-DC, etc.) without the need to first provide a measurement configuration (measConfig) in RRC_CONNECTED, as shown in previous sections, and wait for hundreds of milliseconds until first samples are collected, monitored and then the first reports are triggered and transmitted to the network.

A first aspect of the existing solution, as standardized in EUTRA 36.331, is described in 5.6.20 Idle Mode Measurements. The UE can receive these idle mode measurement configurations in the system information (SIB5) in the field MeasIdleConfigSIB-r15, indicating up to 8 cells or ranges of cell IDs to perform measurements on. In addition, the UE can be either configured upon the transition from RRC_CONNECTED to RRC_IDLE with a dedicated measurement configuration in the RRCConnectionRelease message with the measIdleDedicated-r15 which overrides the broadcasted configurations in SIB5.

Carrier Information and Cell List

The UE is provided with a list of carriers and optionally with a list of cells on which the UE shall perform measurements. The fields s-NonIntraSearch in SystemInformationBlockType3 do not affect the UE measurement procedures in IDLE mode.

Timer T331

Upon the reception of that measurement configuration, the UE starts a timer T331 with the value provided in measIdleDuration, which can go from 0 to 300 seconds. The timer stops upon receiving RRCConnectionSetup, RRCConnectionResume which indicates a transition to RRC_CONNECTED. That concept exists to limit the amount of time the UE performs measurements for the purpose of early measurements.

Validity Area

Another concept introduced in the LTE rel-15 solution is a validity area, which comprises a list of PCIs. The intention is to limit the area where CA or DC may be setup later when the UE resumes/setups the connection, so the early measurements are somewhat useful for that purpose. If validityArea is configured, and UE reselects to a serving cell whose PCI does not match any entry in validityArea for the corresponding carrier frequency, the timer T331 is stopped. Then, UE stops to perform IDLE measurements and releases the configuration (i.e. VarMeasIdleConfig). This does not necessarily imply that the UE releases the idle measurements that were configured in the Release message and that were performed. These may still be stored and possibly requested by the network. In addition, the UE may continue with IDLE mode measurements according to the broadcasted SIB5 configuration after the timer T331 has expired or stopped.

Minimum Quality Threshold

Notice also that only measurements above a certain threshold shall be stored as the cell candidates for CA setup needs to be within a minimum acceptable threshold. How the UE performs measurements in IDLE mode is up to UE implementation as long as RAN4 requirements for measurement reporting defined in 36.133 are met.

Indication of Available Early Measurements Upon Resume Setup in LTE

Another aspect of the existing solution occurs when the UE tries to resume or setup a call from RRC_IDLE without context. If the previous step is performed, such as, for example, if the UE is configured to store idle measurements, the network may request the UE after resume/setup (after security is activated) whether the UE has idle measurements available.

In the case this UE is setting up a connection coming from RRC_IDLE without the AS Context, the network is not aware that the UE has available measurements stored. Then, to allow the network to know that, and possibly request the UE to report early measurements, the UE may indicate the availability of stored idle measurements in RRCConnectionSetupComplete. As not all cells would support the feature anyway, the UE only includes that availability information if the cell broadcasts in SIB2 the idleModeMeasurements indication.

In the case this UE is setting up a connection coming from RRC_IDLE but with a stored AS Context (i.e. resume from suspended), the network may be aware that the UE may have available idle measurements stored after checking the fetched context from the source node where the UE got suspended. However, it is still not certain that the UE has measurements available since the UE is only required to perform the measurements if the cells are above the configured RSRP/RSRQ thresholds and while it performs cell selection/cell reselection within the configured validity area. Then, to allow the network to know that, and possibly request the UE to report early measurements, the UE may also indicate the availability of stored idle measurements in RRCConnectionResumeComplete. As not all cells would support the feature anyway, the UE only includes that availability information if the cell broadcasts in SIB2 the idleModeMeasurements indication.

FIG. 6 illustrates reporting of early measurements upon resume/setup in LTE. Once the UE indicates to the target cell upon resume or setup that idle measurements are available, the network may finally request the UE to report these available measurements by including the field idleModeMeasurementReq in the UEInformationRequest message transmitted to the UE. Then, the UE responds with a UEInformationResponse containing these measurements.

There currently exist certain challenge(s). For example, differently from LTE, in NR, random-access resources are mapped per beam such as, for example, per SSB and/or per CSI-RS. Before random access selection, the UE needs to perform measurements in the target cell, which is the cell where the UE is performing random access, and select a beam based on these measurements (e.g. an SSB for the target cell, i.e. and SSB encoding the PCI, i.e., PSS/SSS of the target cell). Then, after selecting a beam, the UE knows which random access resources to use, since in the RACH configuration contains the mapping between selected DL beam and RACH resources to use (both the dedicated, if provided, or the common RACH configuration), including for example, preamble(s) and time/frequency domain resources. In other words, in NR, random access resource selection needs to be performed within a cell depending on measurements performed on SSBs or CSI-RSs.

FIG. 7 illustrates an example transmission of SSB. As depicted, a cell in NR is basically defined by a set of these SSBs that may be transmitted in one (typical implementation for lower frequencies e.g. below 6 GHz) or multiple downlink beams (typical implementation for lower frequencies e.g. below 6 GHz). For the same cell, these SSBs carry the same physical cell identifier (PCI) and a Master Information Block (MIB). For standalone operation and to support UEs camping on an NR cell, they also carry in SIB1 the RACH configuration, which comprises a mapping between the detected SSB covering the UE at a given point in time and the PRACH configuration (e.g. time, frequency, preamble, etc.) to be used. For that, each of these beams may transmit its own SSB which may be distinguished by an SSB index.

The mapping between RACH resources and SSBs (or CSI-RS) is also provided as part of the RACH configuration (in RACH-ConfigCommon). Two parameters are relevant here:

SSBs-per-PRACH-occasion: ⅛, ¼, ½, 1, 2, 8 or 16, which represents the number of SSBs per RACH occasion;

CB-preambles-per-SSB preambles to each SS-block: within a RACH occasion, how many preambles are allocated;

To given a first example, if the number of SSBs per RACH occasion is 1, and if the UE is under the coverage of a specific SSB e.g. SSB index 2, there will be a RACH occasion for that SSB index 2. If the UE moves and is now under the coverage of another specific SSB e.g. SSB index 5, there will be another RACH occasion for that SSB index 5 i.e. each SSB detected by a given UE would have its own RACH occasion. Hence, at the network side, upon detecting a preamble in a particular RACH occasion the network knows exactly which SSB the UE has selected and, consequently, which downlink beam is covering the UE, so that the network can continue the downlink transmission e.g. RAR, etc. That factor 1 is an indication that each SSB has its own RACH resource. i.e., a preamble detected there indicates to the network which SSB the UE has selection i.e. which DL beam the network should use to communicate with the UE, such as the one to send the RAR.

FIG. 8 illustrates preamble mapping to different RACH occasions, and FIG. 9 illustrates preamble mapping to a same RACH occasion. Note that each SS-block typically maps to multiple preambles (different cyclic shifts and Zadoff-Chu roots) within a PRACH occasion, so that it is possible to multiplex different UEs in the same RACH occasions since they may be under the coverage of the same SSB. In a second example, shown below, the number of SSBs per RACH occasion is two. Hence, a preamble received in that RACH occasion indicated to the network that one of the two beams are being selected by the UE. So either the network has means via implementation to distinguish these two beams and/or should perform a beam sweeping in the downlink by transmitting the RAR in both beams, either simultaneously or, transmitting in one, waiting for a response from the UE, and if absent, transmit in the other.

The examples above are also applicable for CSI-RS resources.

A UE may be configured for early measurements for fast CA/DC setup. While in RRC_CONNECTED, the UE may be configured to perform measurements and trigger measurement reports. That may assist the network to take decisions such as adding, modifying or removing SCell(s), SCG(s), trigger handovers, etc. In the case of NR, the network may configure the UE to apply L3 filtering on beam measurements and include beam measurement information in RRC measurement reports for the serving cell(s) and triggering cell(s) i.e. cells triggering measurement reports. The configuration for beam reporting is provided as part of ReportConfigNR and MeasObject, both possibly included in a measurement configuration (see MeasConfig IE). One of the purposes the network configures the RRC_CONNECTED UE to report beam measurements is to enable the target cell (which may be a target candidate for HO, SCG addition, SCell addition, etc.) to efficiently allocate Contention-Free RACH (CFRA) resources. Upon receiving beam measurements from the UE associated to a target candidate, the source may forward these beam measurements during the preparation phase so that target knows which of its beams are better covering the UE (e.g. SSBs and/or CSI-RSs). Hence, target can limit the provision of CFRA resources only for these beams, since there is a high likelihood that upon performing beam selection during random access, the UE selects one of these beams.

In the existing solution, as explained above, the UE may be configured to report upon resume procedure (or rather at the end of it) cell measurements such as, for example, cell RSRP, cell RSRQ, cell SINR, etc., to assist the network to take faster decisions to configure SCell(s) for the MCG, SCGs (possibly including SCell(s), etc.) instead of waiting for connected mode measurements, which may only be configured in RRC Resume like message. It would take few hundreds of milliseconds until the first reports are received by the network.

If the existing solution in LTE is adopted in NR, the network would have problems in performing CFRA for SCG addition, SCell addition since it would require providing RACH resources for all possible beams (e.g. SSBs) covering the cell, which may be quite inefficient. Hence, network may not even use such a feature due to that inefficiency.

There may be cells that do not transmit SSBs (PSS, SSS or PBCH) within the sync raster. They will not be detected by a UE searching the frequency carrier for cells to camp on. Such cells are not possible to configure for early measurements if the LTE Rel-15 solution is adopted in NR. This would restrict the use of the early measurement feature since those cells would be excluded from the fast setup of CA or DC.

SUMMARY

Certain aspects of the present disclosure and their embodiments may provide solutions to these or other challenges.

According to certain embodiments, a method for measurement reporting performed by a wireless device includes obtaining a beam measurement configuration from a network. Based on the beam measurement configuration, the wireless device performs at least one beam measurement while operating in a dormant state. The wireless device reports a result of the at least one beam measurement to the network. The reporting is done after a transition from the dormant state to a connected state.

According to certain embodiments, a wireless device is provided for measurement reporting. The wireless device includes processing circuitry configured to obtain a beam measurement configuration from a network. Based on the beam measurement configuration, the processing circuitry is configured to perform at least one beam measurement while operating in a dormant state. The processing circuitry is configured to report a result of the at least one beam measurement to the network. The reporting is done after a transition from the dormant state to a connected state.

According to certain embodiments, a method performed by a base station for configuring measurement reporting includes transmitting a beam measurement configuration to a wireless device. The beam measurement configuration configures the wireless device to perform the at least one beam measurement while the wireless device is operating in a dormant state. The base station receives, from the wireless device, a reporting of a result of the at least one beam measurement. The reporting is received after a transition of the wireless device from the dormant state to a connected state.

According to certain embodiments, a base station is provided for configuring measurement reporting. The base station includes processing circuitry configured to transmit a beam measurement configuration to a wireless device. The beam measurement configuration configures the wireless device to perform the at least one beam measurement while the wireless device is operating in a dormant state. The processing circuitry is configured to receive, from the wireless device, a reporting of a result of the at least one beam measurement. The reporting is received after a transition of the wireless device from the dormant state to a connected state.

Certain embodiments may provide one or more of the following technical advantage(s). For example, certain embodiments provide the possibility to efficiently speed up the SCG and SCell additions when the UE is performing state transitions from a dormant state to connected state, by reporting beam measurements to the network in early measurements performed in dormant state when the UE transitions to connected, and enabling the network to allocate CFRA resources for the target SCG(s) and/or SCell(s).

As another example, certain embodiments enable the network to only allocate CFRA resources (or other resources) related to a single DL beam, or a few DL beams, that is/are most likely to be the best beam for the UE in the target SCG(s) and/or SCell(s) such as, for example, the DL beam that the UE will select. This allows e.g. a faster SCG and/or SCell addition at the state transition from a dormant state to connected state without allocating resources, such as dedicated RACH resources, for many (or even all) beams in the cell(s) to be added.

As another example, certain embodiments allow early measurements performed outside the sync raster to be performed by a UE in a dormant state in order to setup SCG(s) and/or SCell(s) that e.g. do not transmit any SSB in the sync raster, i.e. cells that may not be possible for UEs to camp in. As an example, it may be a cell that is only used for UEs in connected state, e.g. as SCells.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
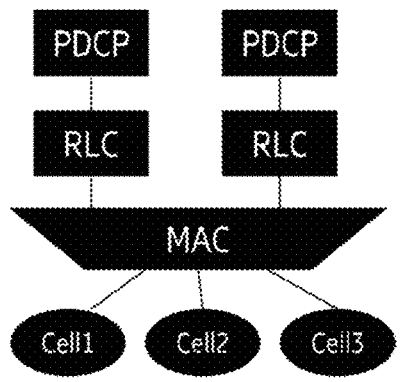
FIG. 1 illustrates multiple Packet Data Convergence Protocols (PDCPs) and Radio Link Controls (RLCs) connected to multiple cells (e.g., Cell1, Cell2, and Cell3) via a MAC layer.
Figure 2:
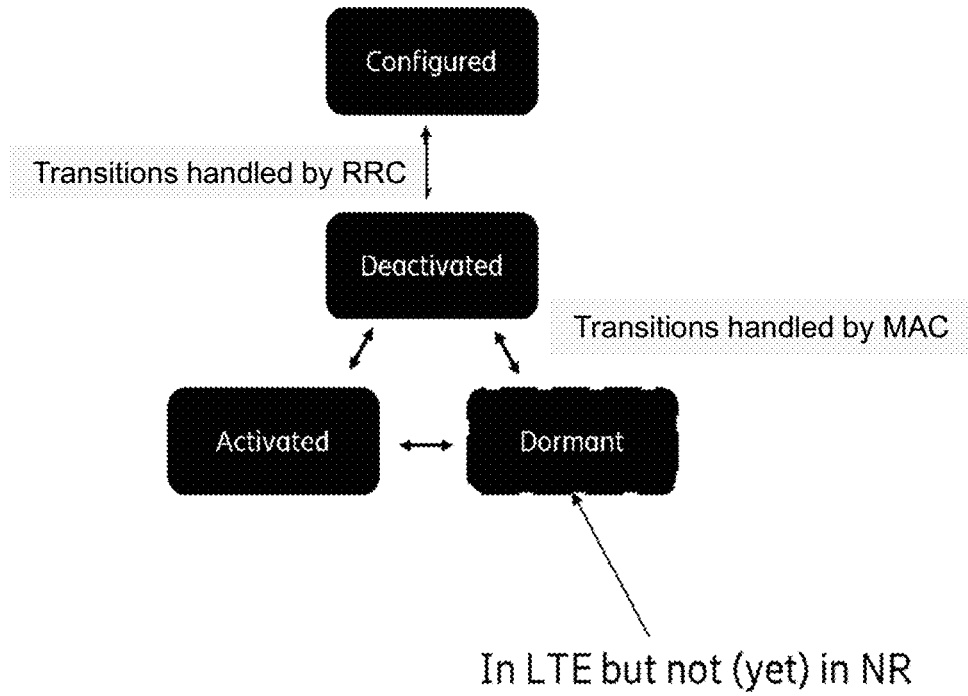
FIG. 2 illustrates the possible states for a cell as discussed in LTE Rel-15.
Figure 3:
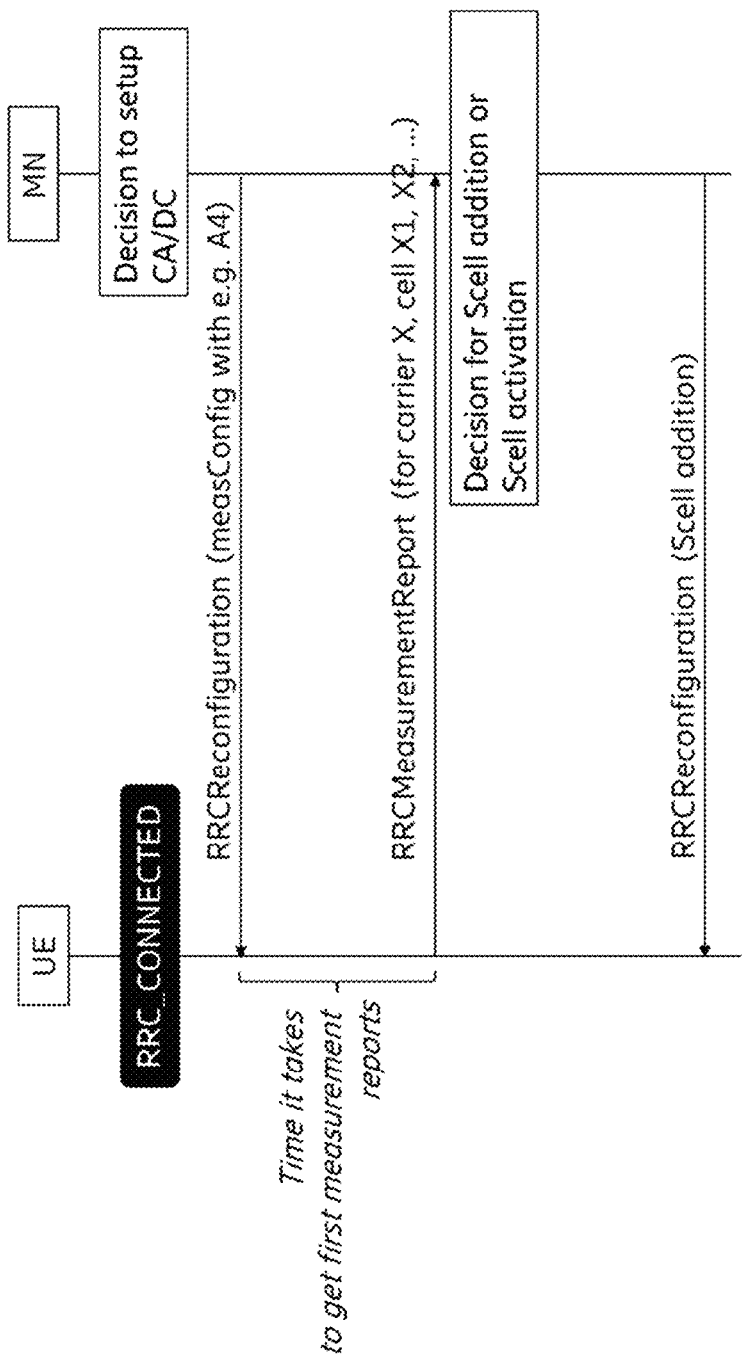
FIG. 3 illustrates a signaling flow diagram for reconfiguration of a User Equipment (UE) in RRC_Connected after the Master Node (MN) makes the decision to set up Carrier Aggregation (CA) and/or Dual Connectivity (DC)
Figure 4:
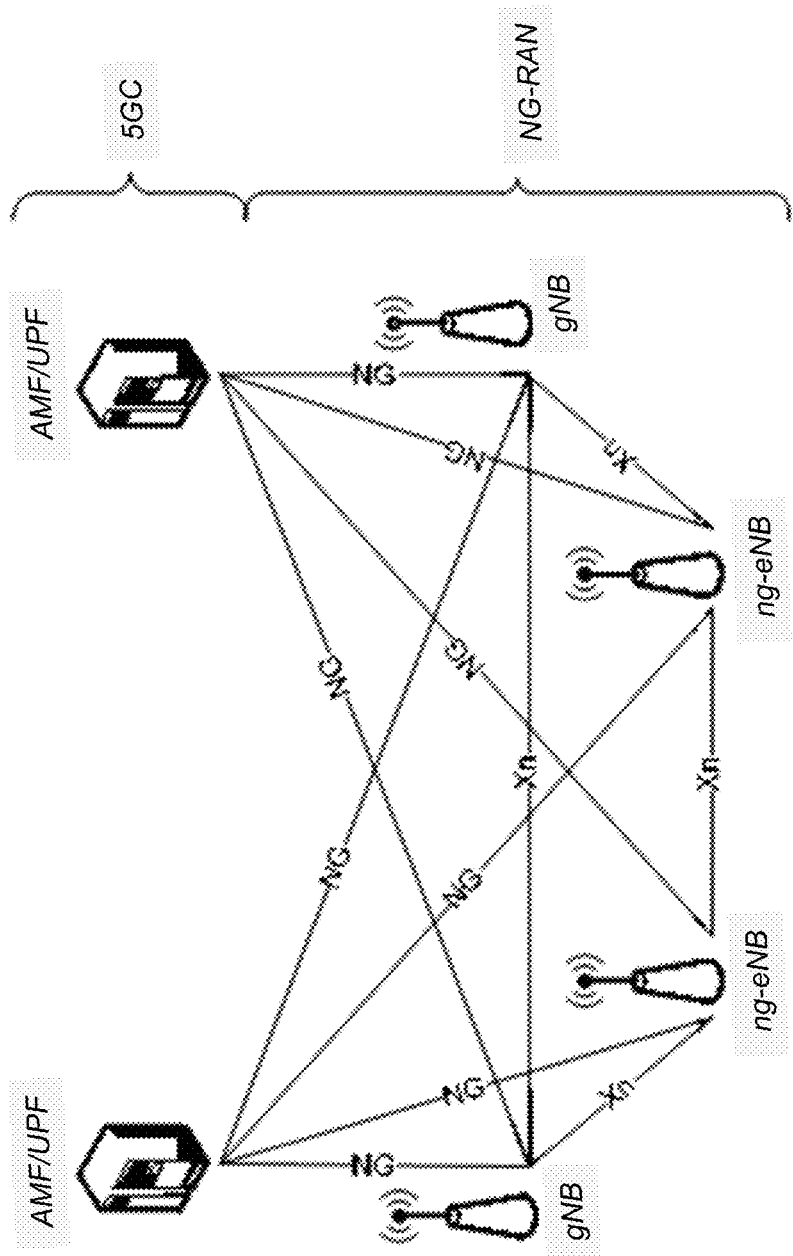
FIG. 4 illustrates preamble mapping to different Radio Access Channel (RACH) occasions.
Figure 5:
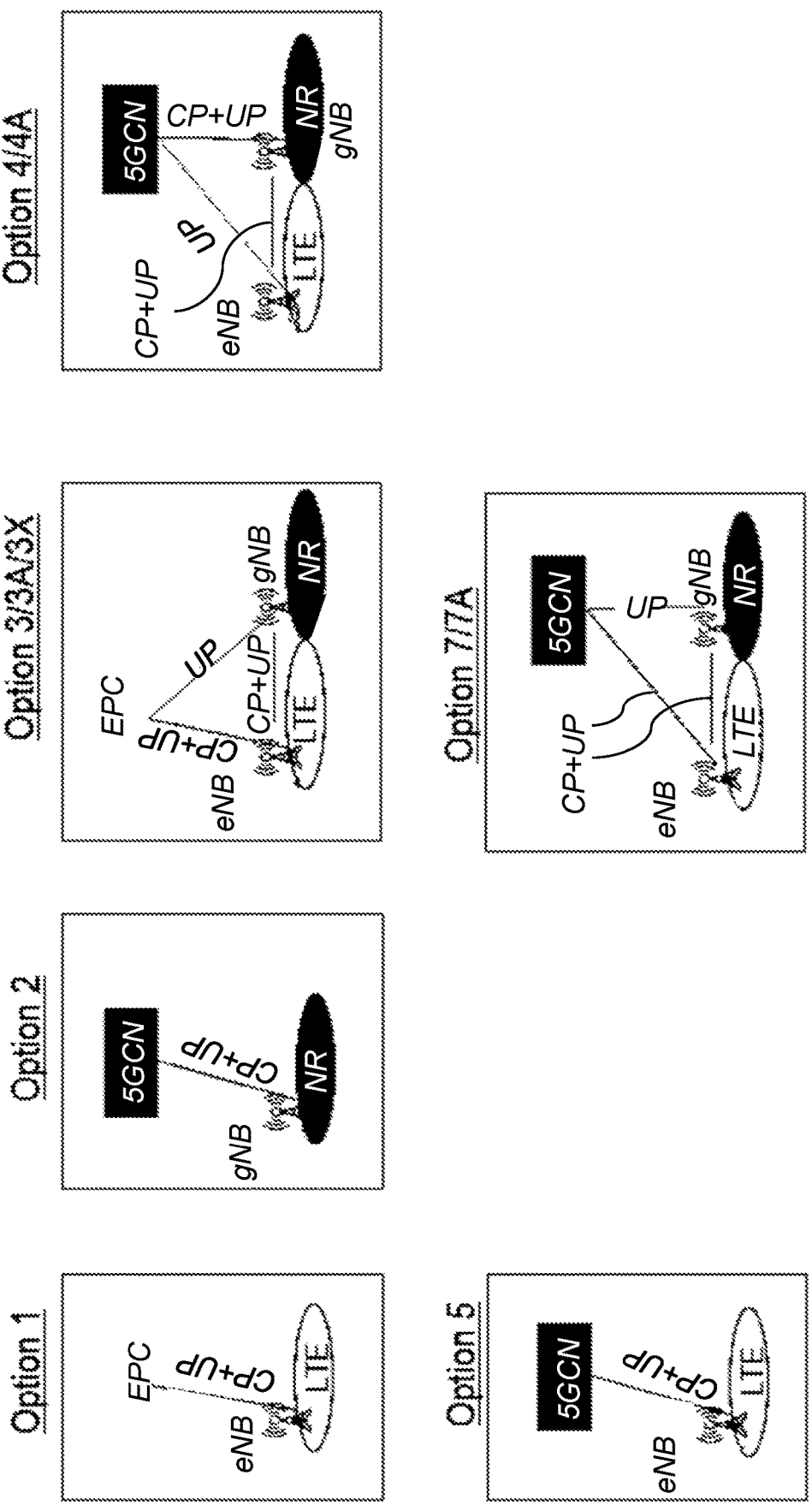
FIG. 5 illustrates preamble mapping to a same RACH occasion.
Figure 6:
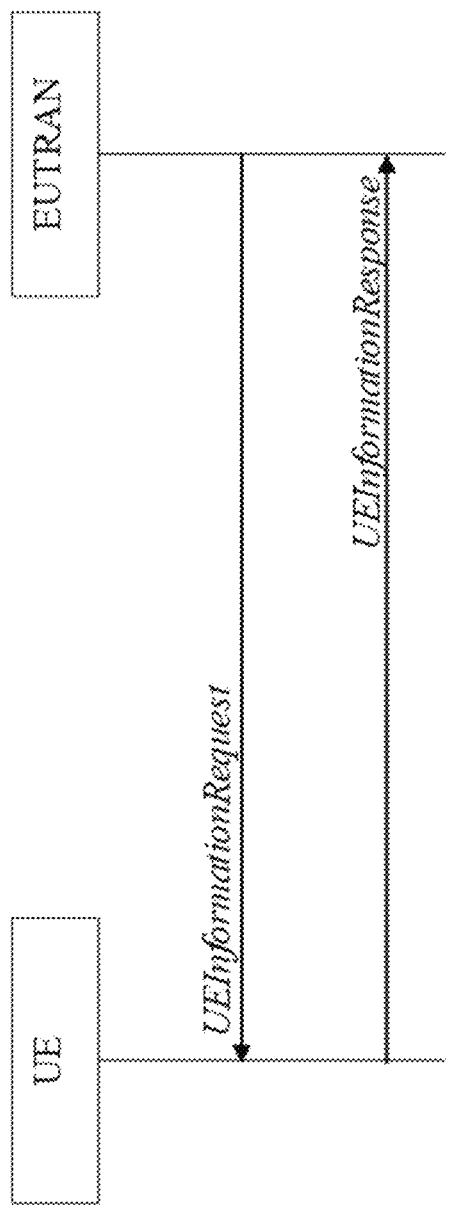
FIG. 6 illustrates reporting of early measurements upon resume/setup in LTE.
Figure 7:
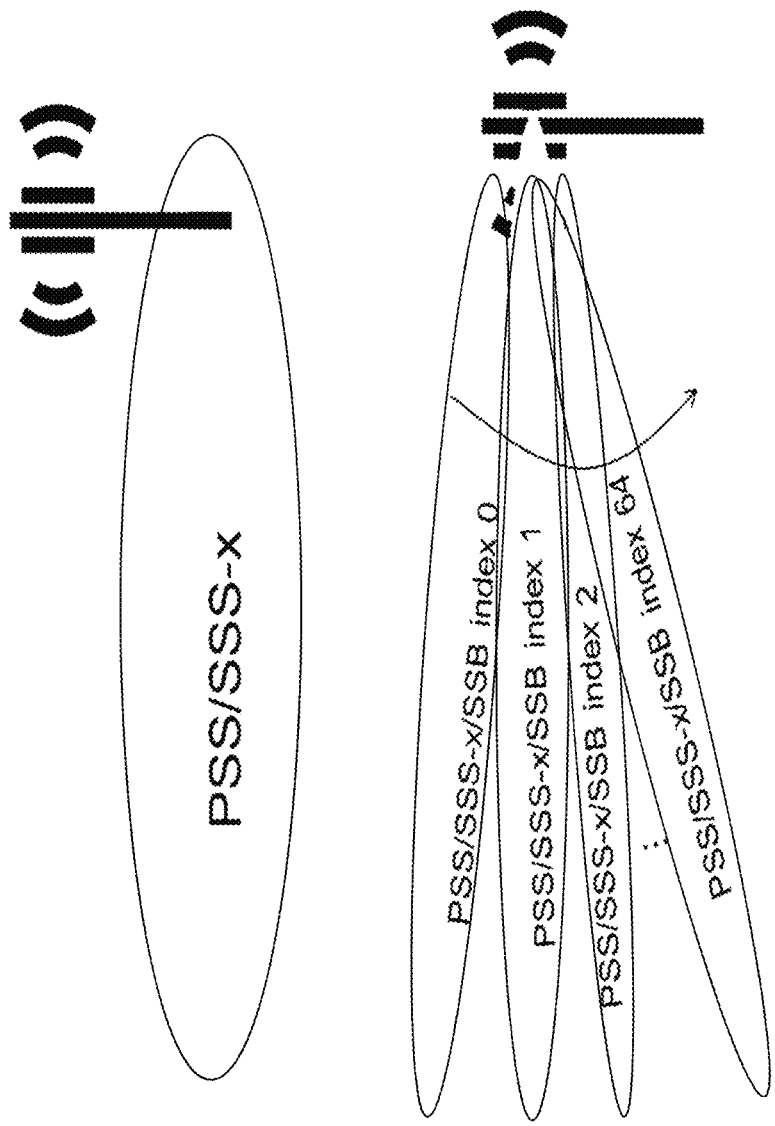
FIG. 7 illustrates an example transmission of Synchronization Signal Block (SSB)
Figure 8:
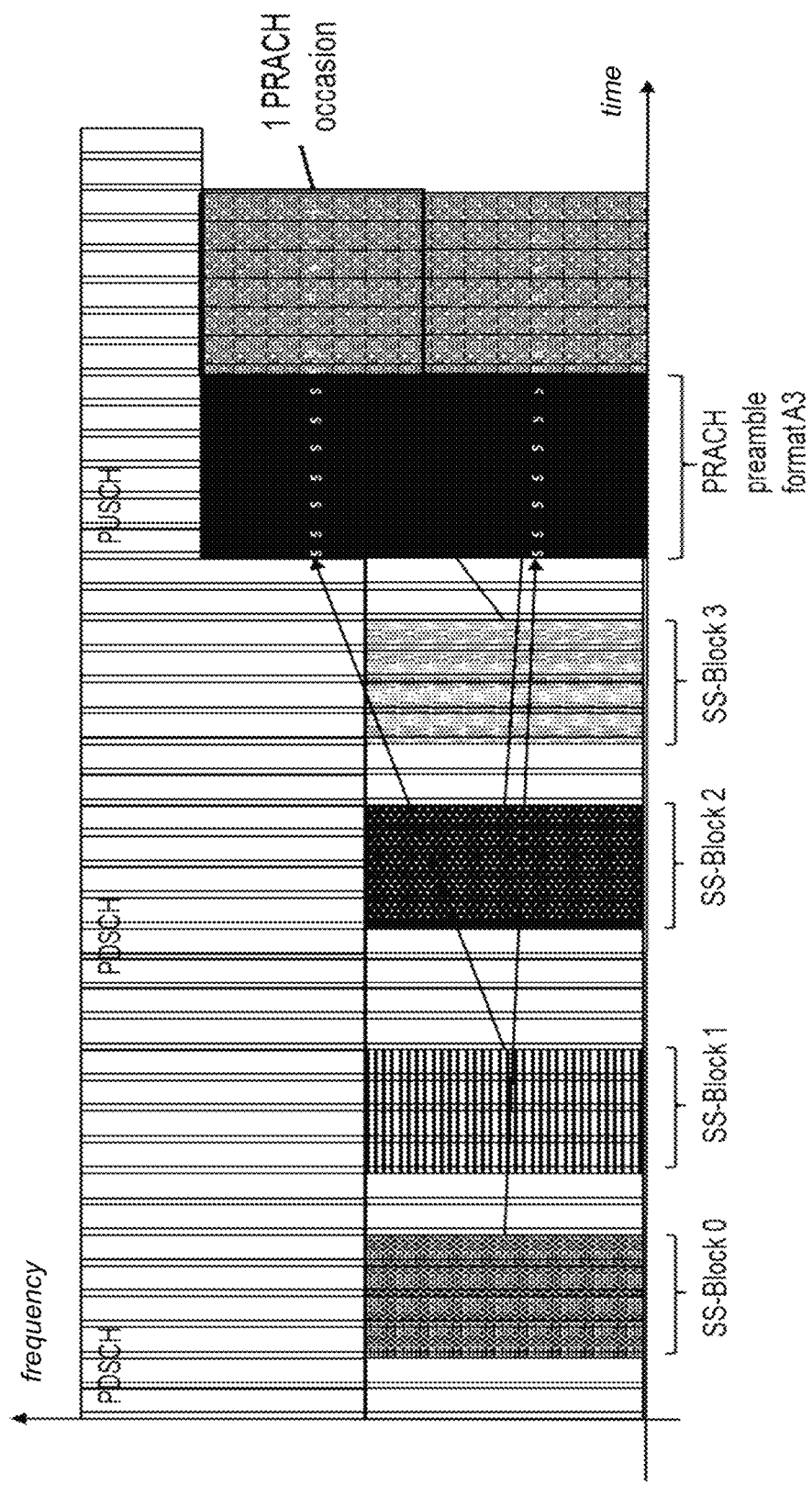
FIG. 8 illustrates preamble mapping to different RACH occasions.
Figure 9:
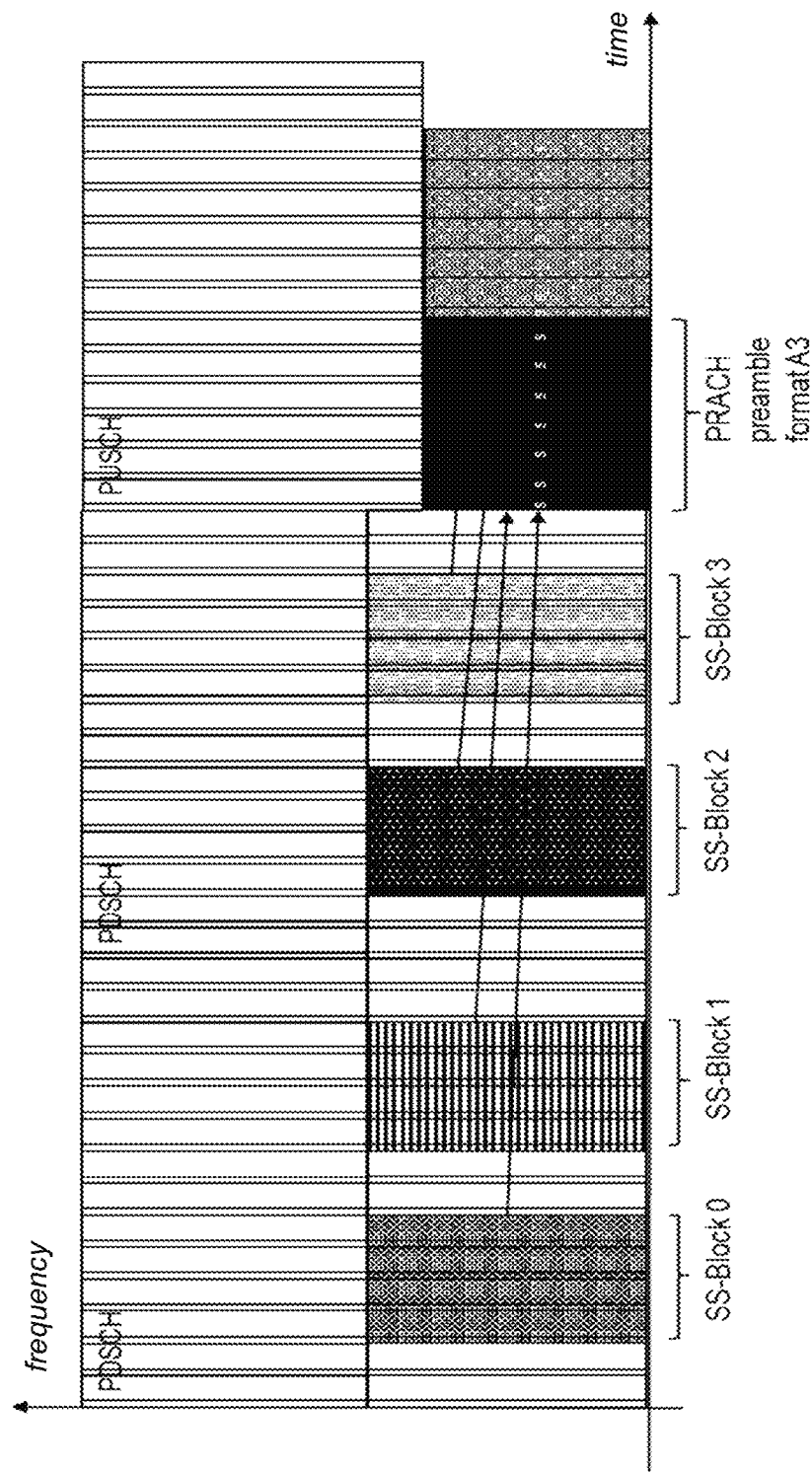
FIG. 9 illustrates preamble mapping to a same RACH occasion.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

According to certain embodiments, a method performed at a wireless terminal/user equipment (UE) for early measurement reporting upon transition from a dormant state (e.g. RRC_IDLE with stored context, RRC_IDLE without stored context, RRC_INACTIVE) to connected includes:
 obtaining from the network a configuration for beam measurement information based on beam measurements performed in a dormant state, where the reporting is done upon the transition from a dormant state to connected state; and
 reporting to the network beam measurement information based on beam measurements performed in a dormant state, where the reporting is done upon the transition from a dormant state to connected state.

According to certain embodiments, a method performed by a source network node configuring a user equipment (UE) upon transition from a connected state to a dormant state (e.g. RRC_IDLE with stored context, RRC_IDLE without stored context. RRC_INACTIVE) may include:
 configuring a UE going to dormant state to perform beam measurements per cell (where a list of one or multiple cells may be provided) and/or per carrier frequency (where a list of one or multiple cells may be provided), where measurements are performed according to a measurement configuration.

According to certain embodiments, a method performed by a target network node where a user equipment (UE) is performing a transition from a dormant state (e.g. RRC_IDLE with stored context, RRC_IDLE without stored context, RRC_INACTIVE) to a connected state includes:
 receiving an early measurement report from a UE performing a transition from dormant state to connected state, where the report includes measurements with beam measurement information performed in dormant state; These beam measurements may be provided per cell for at least one carrier frequency; and
 configuring the UE to perform SCG and/or SCell configuration such as SCG/SCell addition, removal, modification, for at least one cell and providing contention free RACH resources for at least one of the beams reported in the previous step.

According to certain embodiments, a method performed by a source network node configuring a user equipment (UE) upon transition from a connected state to a dormant state (e.g. RRC_IDLE with stored context, RRC_IDLE without stored context, RRC_INACTIVE) includes:

configuring a UE going to dormant state to perform measurements per beam and/or per cell (where a list of one or multiple cells may be provided) and/or per carrier frequency (where a list of one or multiple cells may be provided), where some or all of the measurements are performed outside the sync raster according to a measurement configuration.

As used herein, the term 'beam measurement information' may be interpreted as measurement performed on reference signals (such as SSBs or CSI-RS resources) that may be beamformed by the network. Beam measurement information may be beam measurements such as RSRP, RSRQ or SINR per beam (e.g. SS-RSRP, for RSRP performed on a specific SSB) or information derived from beam measurements, such as a list of beam identifiers where these were selected based on beam measurements e.g. identifiers of strongest beams, or beam above a configurable threshold.

As used herein, beam measurement information may consist of at least one of the following:

Beam identifier of beam(s); If this is an SSB, the SSB identifier. If this is a CSI-RS, a CSI-RS identifier.

Radio conditions of the measured beam/beams (e.g. RSRP, RSRQ, or SINR). These radio conditions may be the ones the UE has used for cell quality derivation while the UE is in dormant state.

In a particular embodiment, the beam identifier is an SSB index. That may be derived based on information transmitted in the MIB payload and its Demodulation reference signals (DM-RS).

In a particular embodiment, the beam identifier is a CSI-RS index. That may be provided by the network via dedicated signaling, associated to a specific CSI-RS resource configuration.

The present disclosure describes the reporting to beam measurement information in early measurements upon the transition from a dormant state (e.g. RRC_IDLE without a stored context, RRC_IDLE with a stored context, RRC_INACTIVE). In the context of the present disclosure a 'beam' may be a reference signal that the UE detects and that has an identifier associated. For example, if the present disclosure is applied to the 3GPP NR standard, the reference signal described above may either be a Synchronization Signal and PBCH Block (SSB) or a CSI-RS.

Figure 10:
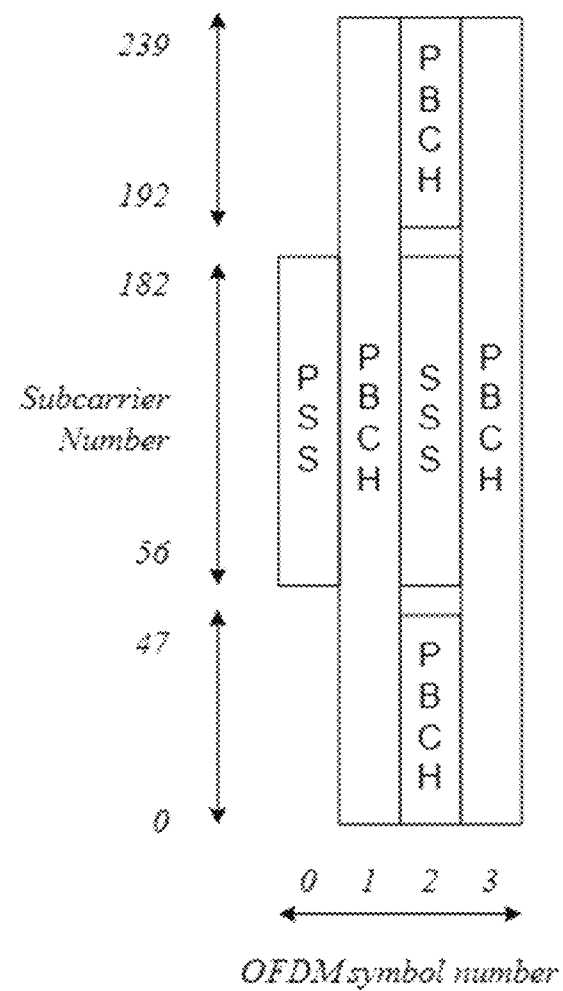
FIG. 10 illustrates an SSB, according to certain embodiments.

FIG. 10 illustrates an SSB, according to certain embodiments. In the case of an SSB that consists of a primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS.

The possible time locations of SSBs within a half-frame are determined by subcarrier spacing and the periodicity of the half-frames where SSBs are transmitted is configured by the network. During a half-frame, different SSBs may be transmitted in different spatial directions (i.e. using different beams, spanning the coverage area of a cell). Within the frequency span of a carrier, multiple SSBs can be transmitted. The PCIs of SSBs transmitted in different frequency locations do not have to be unique, i.e. different SSBs in the frequency domain can have different PCIs. However, when an SSB is associated with an RMSI, the SSB corresponds to an individual cell, which has a unique NCGI (see subclause 8.2). Such an SSB is referred to as a Cell-Defining SSB (CD-SSB). A PCell is always associated to a CD-SSB located on the synchronization raster.

Layer 1 may receive from higher layers a set of SS/PBCH block indexes (or CS-RS) and provides to higher layers a corresponding set of RSRP, RSRQ and/or SINR measurements. These may be called L1 measurement per SSB, L1 measurement per CSI-RS or L1 measurement per beam. These measurements to be logged and reported, according to what the present disclosure describes may be the ones described in the L1 specifications, as reproduced below (for simplicity, only RRSP definitions were provided for CSI-RS and SSB):

SS received signal received power (SS-RSRP)

SS reference signal received power (SS-RSRP) is defined as the linear average over the power contributions (in [W]) of the resource elements that carry secondary synchronization signals. The measurement time resource(s) for SS-RSRP are confined within SS/PBCH Block Measurement Time Configuration (SMTC) window duration. If SS-RSRP is used for L1-RSRP as configured by reporting configurations as defined in 3GPP TS 38.214, the measurement time resources(s) restriction by SMTC window duration is not applicable.

For SS-RSRP determination demodulation reference signals for physical broadcast channel (PBCH) and, if indicated by higher layers, CSI reference signals in addition to secondary synchronization signals may be used. SS-RSRP using demodulation reference signal for PBCH or CSI reference signal shall be measured by linear averaging over the power contributions of the resource elements that carry corresponding reference signals taking into account power scaling for the reference signals as defined in 3GPP TS 38.213. If SS-RSRP is not used for L1-RSRP, the additional use of CSI reference signals for SS-RSRP determination is not applicable.

SS-RSRP shall be measured only among the reference signals corresponding to SS/PBCH blocks with the same SS/PBCH block index and the same physical-layer cell identity.

If SS-RSRP is not used for L1-RSRP and higher-layers indicate certain SS/PBCH blocks for performing SS-RSRP measurements, then SS-RSRP is measured only from the indicated set of SS/PBCH block(s).

For frequency range 1, the reference point for the SS-RSRP shall be the antenna connector of the UE. For frequency range 2, SS-RSRP shall be measured based on the combined signal from antenna elements corresponding to a given receiver branch. For frequency range 1 and 2, if receiver diversity is in use by the UE, the reported SS-RSRP value shall not be lower than the corresponding SS-RSRP of any of the individual receiver branches.

NOTE 1: The number of resource elements within the measurement period that are used by the UE to determine SS-RSRP is left up to the UE implementation with the limitation that corresponding measurement accuracy requirements have to be fulfilled. That information may also be logged in the RACH report, as a novel aspect in the present disclosure.

NOTE 2: The power per resource element is determined from the energy received during the useful part of the symbol, excluding the CP.

CSI reference signal received power (CSI-RSRP)

CSI reference signal received power (CSI-RSRP), is defined as the linear average over the power contributions (in [W]) of the resource elements of the antenna port(s) that carry CSI reference signals configured for RSRP measurements within the considered measurement frequency bandwidth in the configured CSI-RS occasions.

For CSI-RSRP determination CSI reference signals transmitted on antenna port 3000 according to 3GPP TS 38.211 [4] shall be used. If CSI-RSRP is used for L1-RSRP, CSI reference signals transmitted on antenna ports 3000, 3001 can be used for CSI-RSRP determination.

For intra-frequency CSI-RSRP measurements, if the measurement gap is not configured, UE is not expected to measure the CSI-RS resource(s) outside of the active downlink bandwidth part.

For frequency range 1, the reference point for the CSI-RSRP shall be the antenna connector of the UE. For frequency range 2, CSI-RSRP shall be measured based on the combined signal from antenna elements corresponding to a given receiver branch. For frequency range 1 and 2, if receiver diversity is in use by the UE, the reported CSI-RSRP value shall not be lower than the corresponding CSI-RSRP of any of the individual receiver branches.

NOTE 1: The number of resource elements within the considered measurement frequency bandwidth and within the measurement period that are used by the UE to determine CSI-RSRP is left up to the UE implementation with the limitation that corresponding measurement accuracy requirements have to be fulfilled. That information may also be logged in the RACH report, as a novel aspect in the present disclosure.

Though this disclosure is mainly focused on NR, the method is not limited to NR. Rather, the methods described herein apply to many different notions of RATs including:

The RAT where the UE is in RRC_CONNECTED when it is suspended;

The RAT the UE is configured to performed measurements when it is suspended;

The RAT the UE performs RRC connection resume or RRC connection setup and, where the UE sends early measurement reports including beam measurement information;

In the disclosed methods, all different RAT combinations are supported. Some examples are provided below:

UE in RRC_CONNECTED in NR is suspended or released to dormant state (e.g. RRC_IDLE or RRC_INACTIVE) and perform beam measurements for a cell in an NR carrier frequency (this may be a frequency outside the sync raster i.e. where other UEs are possibly not camping or in the sync raster); That UE resume or setup a connection in NR; Then, during that transition to connected these early measurements including beam measurements may be reported.

UE in RRC_CONNECTED in LTE is suspended or released to dormant state (e.g. RRC_IDLE or RRC_INACTIVE) and perform beam measurements for a cell in an NR carrier frequency (this may be a frequency outside the sync raster i.e. where other UEs are possibly not camping or in the sync raster); That UE resume or setup a connection in LTE; Then, during that transition to connected these early measurements including beam measurements may be reported;

UE in RRC_CONNECTED in NR is suspended or released to dormant state (e.g. RRC_IDLE or RRC_INACTIVE) and perform beam measurements for a cell in an NR carrier frequency (this may be a frequency outside the sync raster i.e. where other UEs are possibly not camping or in the sync raster); That UE resume or setup a connection in LTE; Then, during that transition to connected these early measurements including beam measurements may be reported.

UE in RRC_CONNECTED in LTE is suspended or released to dormant state (e.g. RRC_IDLE or RRC_INACTIVE) and perform beam measurements for a cell in an NR carrier frequency (this may be a frequency outside the sync raster i.e. where other UEs are possibly not camping or in the sync raster); That UE resume or setup a connection in NR; Then, during that transition to connected these early measurements including beam measurements may be reported.

In the methods described herein, the UE may be configured to perform beam measurements on frequencies that are outside the sync raster such as, for example, where a UE may possibly not be camping. As an alternative, the UE can be configured to perform measurements on cell level or on carrier level outside the sync raster.

Since a UE may in some cases move between different beams rather quickly, the relevance of the information about what is the best perceived beam(s) decreases with the time from the measurement. According to certain embodiments, a method is provided where the network configures the UE with a threshold for how old measurements on beam level that are considered as useful. The UE can then be configured to only report measurements on beam level if the measurements are performed within a configured or defined time period before the time of the reporting. As an alternative, the UE includes beam level measurements (even if they are old) in the report but then also includes information about how old the measurements are, i.e. information about when the reported measurements were performed.

According to certain embodiments, a method performed at a wireless terminal/user equipment (UE) for early measurement reporting upon transition from a dormant state (e.g. RRC_IDLE with stored context, RRC_IDLE without stored context, RRC_INACTIVE) to connected, the method includes:

Obtaining from the network a configuration for beam measurement information based on beam measurements performed in a dormant state, where the reporting is done upon the transition from a dormant state to connected state.

There could be different alternatives for the UE to obtain the configuration to perform beam measurements while it is in dormant state.

According to certain embodiments, the UE may receive a dedicated measurement configuration when it is suspended or released to dormant state. That configuration may be included in an RRC Release message (e.g. RRCConnectionRelease or RRCRelease). That may contain information currently provided only in measurement objects (such as cell quality derivation parameters, such as consolidation thresholds provided per carrier and RS type) and reporting configurations such as number of beams to report, measurement quantities for beam measurements to include, a flag indication that not only beam indexes but also measurements are to be included, etc.

According to certain embodiments, the configuration of beam measurements also has a validity timer associated. That may be the same validity timer defined for cell measurements, also provided as part of the configuration.

According to certain embodiments, the configuration of beam measurements also has a validity area associated. That may be the same validity are defined for cell measurements, also provided as part of the configuration.

According to certain embodiments, the configuration may contain a list of carriers (e.g. NR carriers, LTE carriers or both NR and LTE carriers). The UE perform measurements (including beam measurements) for these carriers.

According to certain embodiments, the configuration may contain a list of cells (e.g. for a configured carrier) the UE only perform measurements in the indicated cells.

According to certain embodiments, the configuration may contain a list of beams (e.g. for a configured carrier and/or cell, where beams may be SSB indexes or CSI-RS resource indexes) the UE only perform measurements in the indicated beams.

According to certain embodiments, the configuration may contain any parameters as shown above, i.e., parameters that would typically be configured only in MeasObjectNR or ReportConfig, and now is being provided in RRCRelease.

According to certain embodiments, that configuration may be defined as highlighted below:

| RRCRelease message |
|---|
| ```
-- ASN1START
-- TAG-RRCRELEASE-START
RRCRelease ::=                              SEQUENCE {
    rrc-TransactionIdentifier                   RRC-TransactionIdentifier,
    criticalExtensions                          CHOICE {
        rrcRelease                                  RRCRelease-IEs,
        criticalExtensionsFuture                    SEQUENCE { }
    }
}
RRCRelease-IEs ::=                          SEQUENCE {
    redirectedCarrierInfo                       RedirectedCarrierInfo
                                                  OPTIONAL, -- Need N
    cellReselectionPriorities                   CellReselectionPriorities
                                                  OPTIONAL, -- Need R
    suspendConfig                               SuspendConfig
                                                  OPTIONAL, -- Need R
    deprioritisationReq                         SEQUENCE {
        deprioritisationType                        ENUMERATED {frequency, nr},
        deprioritisationTimer                       ENUMERATED {min5, min10, min15, min30}
    }
    measIdleInactiveConfig-r16                  MeasIdleInactiveConfigDedicated-r16 OPTIONAL,
                                                  -- Need ON
                                                  OPTIONAL, -- Need N
    lateNonCriticalExtension                    OCTET STRING
                                                  OPTIONAL,
    nonCriticalExtension                        RRCRelease-v1540-IEs
                                                  OPTIONAL
}
RRCRelease-v1540-IEs ::=                    SEQUENCE {
    waitTme                                     RejectWaitTme       OPTIONAL, --
                                                  Need N
    nonCriticalExtension                        SEQUENCE { }        OPTIONAL
}
RedirectedCarrierInfo ::=                   CHOICE {
    nr                                          CarrierInfoNR,
    eutra                                       RedirectedCarrierInfo-EUTRA,
    ...
}
RedirectedCarrierInfo-EUTRA ::=             SEQUENCE {
    eutraFrequency                              ARFCN-ValueEUTRA,
    cnType-r15                                  ENUMERATED {epc, fiveGC}
        OPTIONAL -- Need N
}
CarrierInfoNR ::=                           SEQUENCE {
    carrierFreq                                 ARFCN-ValueNR,
    ssbSubcarrierSpacing                        SubcarrierSpacing,
    smtc                                        SSB-MTC
        OPTIONAL, -- Need S
    ...
}
SuspendConfig ::=                           SEQUENCE {
    fullI-RNTI                                  I-RNTI-Value,
    shortI-RNTI                                 ShortI-RNTI-Value,
    ran-PagingCycle                             PagingCycle,
    ran-NotificationAreaInfo                    RAN-NotificationAreaInfo
        OPTIONAL, -- Need M
    t380                                        PeriodicRNAU-TmerValue
        OPTIONAL, -- Need R
    nextHopChainingCount                        NextHopChainingCount,
    ...
}
PeriodicRNAU-TmerValue ::=                  ENUMERATED { min5, min10, min20, min 30, min60,
    min120, min360, min720)
CellReselectionPriorities ::=               SEQUENCE {
    freqPriorityListEUTRA                       FreqPriorityListEUTRA
        OPTIONAL, -- Need M
    freqPriorityListER                          FreqPriorityListER
``` |

| RRCRelease message |
| --- |

```
OPTIONAL, -- Need M
   t320                              ENUMERATED {min5, min10, min20, min30, min60
min120, min180, spare1} OPTIONAL,    -- Need R
   ...
}
PagingCycle ::=                      ENUMERATED {rf32, rf64, rf128, rf256}
FreqPriorityListEUTRA ::=            SEQUENCE (SIZE (1..maxFreq)) OF FreqPriorityEUTRA
FreqPriorityListNR ::=               SEQUENCE (SIZE (1..maxFreq)) OF FreqPriorityNR
FreqPriorityEUTRA ::=                SEQUENCE {
   carrierFreq                          ARFCN-ValueEUTRA,
   cellReselectionPriority              CellReselectionPriority,
   cellReselectionSubPriority           CellReselectionSubPriority
OPTIONAL -- Need R
}
FreqPriorityNR ::=                   SEQUENCE {
   carrierFreq                          ARFCN-ValueNR,
   cellReselectionPriority              CellReselectionPriority,
   cellReselectionSubPriority           CellReselectionSubPriority
OPTIONAL -- Need R
}
RAN-NotificationAreaInfo ::=         CHOICE {
   cellList                             PLMN-RAN-AreaCellList,
   ran-AreaConfigList                   PLMN-RAN-AreaConfigList,
   ...
}
PLMN-RAN-AreaCellList ::=            SEQUENCE (SIZE (1..maxPLMNIdentities)) OF PLMN-
RAN-AreaCell
PLMN-RAN-AreaCell ::=                SEQUENCE {
   plmn-Identity                        PLMN-Identity
OPTIONAL, -- Need S
   ran-AreaCells                        SEQUENCE (SIZE (1..32)) OF CellIdentity
}
PLMN-RAN-AreaConfigList ::=          SEQUENCE (SIZE (1..maxPLMNIdentities)) OF PLMN-
RAN-AreaConfig
PLMN-RAN-AreaConfig ::=              SEQUENCE {
   plmn-Identity                        PLMN-Identity
OPTIONAL, -- Need S
   ran-Area                             SEQUENCE (SIZE (1..16)) OF RAN-AreaConfig
}
RAN-AreaConfig ::=                   SEQUENCE {
   trackingAreaCode                     TrackingAreaCode,
   ran-AreaCodeList                     SEQUENCE (SIZE (1..32)) OF RAN-AreaCode
OPTIONAL -- Need R
}
-- TAG-RRCRELEASE-STOP
-- ASN1STOP
```

| MeasIdleConfig information element |
| --- |

```
-- ASN1START
MeasIdleConfigSIB-r15 ::= SEQUENCE {
   measIdleCarrierListEUTRA-r15      EUTRA-CarrierList-r15,
   ...
}
MeasIdleInactiveConfigDedicated-r16 ::= SEQUENCE {
   measIdleCarrierListEUTRA-r16      EUTRA-CarrierList-r16              OPTIONAL, -
- Need OR
   measIdleCarrierListNR-r16         NR-CarrierList-r16                 OPTIONAL, -
- Need OR
   measIdleDuration-r16              ENUMERATED {sec10, sec30, sec60, sec120,
                                        sec180, sec240, sec300, spare},
   ...
   quantityConfig                    QuantityConfig
OPTIONAL,
}
measIdleCarrierListNR-r16::= SEQUENCE (SIZE (1..maxEregIdle-r16)) OF
MeasIdleCarrierNR-r16
MeasIdleCarrierNR-r16 ::=            SEQUENCE {
// NR related configuration for early measurements
ssbFrequency                         ARECN-ValueNR
OPTIONAL, -- Cond SSBorAssociatedSSB
   ssbSubcarrierSpacing              SubcarrierSpacing
OPTIONAL, -- Cond SSBorAssociatedSSB
   smtc1                             SSB-MTC
```

| MeasIdleConfig information element |
| --- |

```
OPTIONAL, -- Cond SSBorAssociatedSSB
   smtc2                              SSB-MTC2
OPTIONAL, -- Cond IntraFreqConnected
   refFreqCSI-RS                      ARFCN-ValueNR
OPTIONAL, -- Cond CSI-RS
   absThreshSS-BlocksConsolidation    ThresholdNR
OPTIONAL, -- Need R
   absThreshCSI-RS-Consolidation      ThresholdNR
OPTIONAL, -- Need R
   nrofSS-BlocksToAverage             INTEGER (2..maxNrofSS-BlocksToAverage)
OPTIONAL, -- Need R
   nrofCSI-RS-ResourcesToAverage      INTEGER (2..maxNrofCSI-RS-ResourcesToAverage)
OPTIONAL, -- Need R
   quantityConfigIndex                INTEGER (1..maxNrofQuantityConfig),
   freqBandIndicatorNR-v1.530         FreqBandIndicatorNR
OPTIONAL, -- Need R
   quantityConfigIndex                INTEGER (1..maxNrofQuantityConfig),
   refFreqCSI-RS                      ARFCN-ValueNR
OPTIONAL, -- Cond CSI-RS
   referenceSignalConfig              ReferenceSignalConfig,
// Beam Measurement configuration
   reportQuantityRS-Indexes              MeasReportQuantity
OPTIONAL, -- Need R
   maxNrofRS-IndexesToReport             INTEGER (1..maxNrofIndexesToReport)
OPTIONAL, -- Need R
   includeBeamMeasurements               BOOLEAN,
// Other early measurement configuration
   validityArea-r16                   CellList-r16                    OPTIONAL, -
- Need OR
   measCellListNR-r16                 CellListNR-r16                  OPTIONAL, -
- Need OR
   reportQuantities                   ENUMERATED {rsrp, rsrq, both},
   qualityThresholdNR-r16             SEQUENCE {
      idleInactiveRSRP-Threshold-r16     RSRP-Range                   OPTIONAL, --
Need OR
      idleInactiveRSRQ-Threshold-r16     RSRQ-Range                   OPTIONAL --
Need OR
      idleInactiveSINR-Threshold-r16     SINR-Range                   OPTIONAL --
Need OR
   }                                                                  OPTIONAL, -
- Need OR
   ...
}
CellListNR-r16 ::= SEQUENCE (SIZE (1.. maxCellMeasIdleNR-r16)) OF PCI-
RangeIndexList
PCI-RangeElement ::=                  SEQUENCE {
   pci-RangeIndex                        PCI-RangeIndex,
   pci-Range                             PCI-Range
}
PCI-RangeIndex ::=                    INTEGER (1..maxNrofPCI-Ranges)
PCI-Range ::=                         SEQUENCE {
   start                                 PhysCellId,
   range                                 ENUMERATED {n4, n8, n12, n16, n24, n32, n48,
n64, n84,
                                          n96, n128, n168, n252, n504,
n1008,spare1} OPTIONAL -- Need S
}
// for field descriptions, see MeasObjectNR
ReferenceSignalConfig::=              SEQUENCE {
   ssb-ConfigMobility                    SSB-ConfigMobility
OPTIONAL, -- Need M
   csi-rs-ResourceConfigMobility         SetupRelease { CSI-RS-ResourceConfigMobility
}                                     OPTIONAL -- Need M
}
SSB-ConfigMobility::=                 SEQUENCE {
   ssb-ToMeasure                         SetupRelease { SSB-ToMeasure }
OPTIONAL, -- Need M
   deriveSSB-IndexFromCell               BOOLEAN,
   ss-RSSI-Measurement                   SS-RSSI-Measurement
OPTIONAL, -- Need M
   ...
}
EUTRA-CarrierList-r16 ::= SEQUENCE (SIZE (1..maxEregIdle-r16)) OF
MeasIdleCarrierEUTRA-r16
MeasIdleCarrierEUTRA-r15::=
   carrierFreq-r15                    ARFCN-ValueEUTRA-r9,
   allowedMeasBandwidth-r15           AllowedMeasBandwidth,
```

-continued

| MeasIdleConfig information element | | |
|---|---|---|
| validityArea-r15<br>- Need OR | CellList-r15 | OPTIONAL, - |
| measCellList-r15<br>- Need OR | CellList-r15 | OPTIONAL, - |
| reportQuantlties | ENUMERATED {rsrp, rsrq, both}, | |
| qualityThreshold-r15 | SEQUENCE { | |
| idleRSRP-Threshold-r15<br>- Need OR | RSRP-Range | OPTIONAL, - |
| idleRSK-Threshold-r15<br>- Need OR | RSRQ-Range-r13 | OPTIONAL - |
| }<br>- Need OR | | OPTIONAL, - |
| . . . | | |
| }<br>CellList-r15 ::= SEQUENCE (SIZE (1 . . maxCellMeasIdle-r15)) OF PhysCellIdRange<br>-- ASN1STOP | | |

MeasIdleConfig Field Descriptions absThreshCSI-RS-Consolidation
Absolute threshold for the consolidation of measurement results per CSI-RS resource(s) from L1 filter(s). The field is used for the derivation of cell measurement results and the reporting of beam measurement information per CSI-RS resource in early idle/inactive measurement reporting upon resume.

absThreshSS-BlocksConsolidation
Absolute threshold for the consolidation of measurement results per SS/PBCH block(s) from L1 filter(s). The field is used for the derivation of cell measurement results and the reporting of beam measurement information per SS/PBCH block index in early idle/inactive measurement reporting upon resume.

allowedMeasBandwidth
If absent, the value corresponding to the downlink bandwidth indicated by the dl-Bandwidth included in MasterInformationBlock of serving cell applies.

carrierFreq
Indicates the E-UTRA carrier frequency to be used for measurements during IDLE or INACTIVE mode.

freqBandIndicatorNR
The frequency band in which the SSB and/or CSI-RS indicated in this configuration are located and according to which the UE shall perform the early IDLE and INACTIVE mode measurements.

includeBeamMeasurementsis
if includeBeamMeasurements is configured, include the CSI-RS based measurement results for the quantities in reportQuantityRS-Indexes set to TRUE for each CSI-RS index.

maxNrofRS-IndexesToReport
Max number of RS indexes to include in the measurement report for early idle/inactive measurement report upon transition to connected measIdleCarrierListEUTRA
Indicates the E-UTRA carriers to be measured during IDLE or INACTIVE mode.

measIdleDuration
Indicates the duration for performing measurements during IDLE or INACTIVE mode for measurements assigned via RRCConnectionRelease. Value sec10 correspond to 10 seconds, value sec30 to 30 seconds and so on.

nrofCSInrofCSI-RS-ResourcesToAverage
Indicates the maximum number of measurement results per beam based on CSI-RS resources to be averaged. The same value applies for each detected cell associated with this carrier frequency.

nrofSS-BlocksToAverage
Indicates the maximum number of measurement results per beam based on SS/PBCH blocks to be averaged. The same value applies for each detected cell associated with this carrier frequency.

quantityConfig
Indicates the list of sets of filter coefficients for early idle/inactive mode measurements. These may be set per RS type, cells and beams, and measurement quantity (e.g. RSRP, RSRQ, SINR).

quantityConfigindex
Indicates the n-th element of quantityConfigNR-List for a given NR carrier.

MeasIdleConfig Field Descriptions absThreshCSI-RS-Consolidation
Absolute threshold for the consolidation of measurement results per CSI-RS resource(s) from L1 filter(s). The field is used for the derivation of cell measurement results and the reporting of beam measurement information per CSI-RS resource in early idle/inactive measurement reporting upon resume.

absThreshSS-BlocksConsolidation
Absolute threshold for the consolidation of measurement results per SS/PBCH block(s) from L1 filter(s). The field is used for the derivation of cell measurement results and the reporting of beam measurement information per SS/PBCH block index in early idle/inactive measurement reporting upon resume.

qualityThreshold
Indicates the quality thresholds for reporting the measured cells for IDLE or INACTIVE mode measurements.

reportQuantities
Indicates which cell measurement quantities UE is requested to report in the IDLE or INACTIVE mode measurement report.

reportQuantityRS-Indexes
Indicates which measurement information per RS index the UE shall include in early idle/inactive measurement report upon transition to connected.

measCellList
Indicates the list of cells which the UE is requested to measure and report for IDLE or INACTIVE mode measurements. In this case, UE only perform beam measurements (e.g. SSB measurements) for the indicated cells.

refFreqCSI-RS

Point A which is used for mapping of CSI-RS to physical resources according to TS 38.211 [16] clause 7.4.1.5.3.

ssbFrequency

Indicates the frequency of the SS associated to this carrier configured for IDLE or INACTIVE mode measurements.

MeasIdleConfig Field Descriptions absThreshCSI-RS-Consolidation

Absolute threshold for the consolidation of measurement results per CSI-RS resource(s) from L1 filter(s). The field is used for the derivation of cell measurement results and the reporting of beam measurement information per CSI-RS resource in early idle/inactive measurement reporting upon resume.

absThreshSS-BlocksConsolidation

Absolute threshold for the consolidation of measurement results per SS/PBCH block(s) from L1 filter(s). The field is used for the derivation of cell measurement results and the reporting of beam measurement information per SS/PBCH block index in early idle/inactive measurement reporting upon resume.

ssbSubcarrierSpacing

Subcarrier spacing of SSB. Only the values 15 or 30 (<6 GHz), 120 kHz or 240 kHz (>6 GHz) are applicable smtc1

Primary measurement timing configuration. (see clause 5.5.2.10).

smtc2

Secondary measurement timing configuration for SS corresponding to this carrier configured for IDLE or INACTIVE mode measurements with PCI listed in the same configuration. For these SS, the periodicity is indicated by periodicity in smtc2 and the timing offset is equal to the offset indicated in periodicityAndOffset modulo periodicity. periodicity in smtc2 can only be set to a value strictly shorter than the periodicity indicated by periodicityAndOffset in smtc1 (e.g. if periodicityAndOffset indicates sf10, periodicity can only be set of sf5, if periodicityAndOffset indicates sf5, smtc2 cannot be configured).

validityArea

Indicates the list of cells within which UE is requested to do IDLE mode or INACTIVE measurements, including beam measurements. If the UE reselects to a cell outside this list, the measurements are no longer required.

A possible procedure text in RRC for the proposed method could be the following:

5.7.6 Idle/Inactive Mode Measurements 5.7.6.1 General

This procedure specifies the measurements done by a UE in RRC_IDLE or in RRC_INACTIVE when it has an IDLE/INACTIVE mode measurement configuration and the storage of the available measurements by a UE in RRC_IDLE, RRC_INACTIVE and RRC_CONNECTED.

5.7.6.2 Initiation

While T331 is running, the UE shall:
1> perform the measurements in accordance with the following:
2> for each entry in measIdleCarrierListNR-r16 within VarMeasIdleConfig:
3> if UE supports carrier aggregation and/or dual connectivity (or any form of MR-DC) between serving carrier and the carrier frequency indicated by ssbFrequency within the corresponding entry;
4> perform measurements in the carrier frequency and bandwidth indicated by ssbFrequency within the corresponding entry;
4> if the measCellListNR-r16 is included:
5> consider PCell and cells identified by each entry within the measCellListNR-r16 to be applicable for idle/inactive mode measurement reporting;
4> else:
5> consider PCell and up to maxCellMeasIdleNR-r16 strongest identified cells whose RSRP/RSRQ/SINR measurement results are above the value(s) provided in qualityThresholdNR (if any) to be applicable for idle mode measurement reporting;
4> if the reportQuantityRS-Indexes and maxNrofRS-IndexesToReport is included:
5> perform measurements for the indicated measurement quantities in reportQuantityRS-Indexes whose RSRP/RSRQ/SINR measurement results are above the value(s) provided in absThreshSS-BlocksConsolidation or absThreshCSI-RS-Consolidation (if any);
4> store measurement results for cells applicable for idle mode measurement reporting within the VarMeasIdleReport;
3> else:
4> do not consider the carrier frequency to be applicable for idle/inactive mode measurement reporting;
2> for each entry in measIdleCarrierListEUTRA within VarMeasIdleConfig:
3> if UE supports carrier aggregation between serving carrier and the carrier frequency and bandwidth indicated by carrierFreq and allowedMeasBandwidth within the corresponding entry;
4> perform measurements in the carrier frequency and bandwidth indicated by carrierFreq and allowedMeasBandwidth within the corresponding entry;
NOTE: The fields s-NonIntraSearch in SystemInformationBlockType3 do not affect the UE measurement procedures in IDLE mode. How the UE performs measurements in IDLE mode is up to UE implementation as long as the requirements in TS 36.133 [16] are met for measurement reporting. UE is not required to perform idle measurements if SIB2 idle measurement indication is not configured.
4> if the measCellList is included:
5> consider PCell and cells identified by each entry within the measCellList to be applicable for idle mode measurement reporting;
4> else:
5> consider PCell and up to maxCellMeasIdle strongest identified cells whose RSRP/RSRQ measurement results are above the value(s) provided in qualityThreshold (if any) to be applicable for idle mode measurement reporting;

4> store measurement results for cells applicable for idle mode measurement reporting within the VarMeasIdleReport;
3> else:
4> do not consider the carrier frequency to be applicable for idle mode measurement reporting;
1> if validityArea is configured in VarMeasIdleConfig and UE reselects to a serving cell whose physical cell identity (which may either be an NR cell or an LTE or a combination of NR and LTE cells) does not match any entry in validityArea for the corresponding carrier frequency:
2> stop T331;
5.7.6.3 T331 expiry or stop
The UE shall:
1> if T331 expires or is stopped:
2> release the VarMeasIdleConfig, including both beam and cell measurements;

According to certain other embodiments, the UE may obtain configuration for INACTIVE/IDLE measurements for early report upon transition from dormant to connected in the system information of each cell the UE selects (e.g. upon transition to dormant state) or re-selects (while the UE moves in dormant state and performs cell reselection). The UE may get indication in the suspend/release procedure (e.g. in a configuration in RRC Release like message), but the UE obtains the measurement configuration in the system information to perform the idle/inactive measurements to be logged and later possibly reported during the state transition. The UE may obtain the measurement configuration for these early idle/inactive measurements in SIB2 and/or SIB4 (in the case of inter-frequency measurements).

In a particular embodiment, in SIB2, the UE may obtain common parameters for inter-frequency and intra-frequency, while in SIB4 the UE may obtain parameters to perform measurements on a given carrier frequency where parameters are also provided per frequency.

In a particular embodiment, the UE may also obtain only measurements parameters in SIB4 for the carrier possibly configured in dedicated signaling. For example, in a variant, the UE receives a list of carriers in dedicated signaling but no measurement parameters (e.g. no CQD settings, thresholds, etc.), but obtains these parameters by matching the same carrier upon obtaining parameters in SIB4.

SIB2, for example, contains CQD parameters, and further parameters related to beam measurements and beam reporting, as shown below:

SIB2

SIB2 contains cell re-selection information common for intra-frequency, inter-frequency and/or inter-RAT cell re-selection (i.e. applicable for more than one type of cell re-selection but not necessarily all) as well as intra-frequency cell re-selection information other than neighbouring cell related. It also contains configuration for inactive/idle mode measurements to be possibly reported during transitions to connected, if requested by the network and if available.

| SIB2 information element |
|---|

```
-- ASN1START
-- TAG-SIB2-START
SIB2 ::=                              SEQUENCE {
  cellReselectionInfoCommon             SEQUENCE {
    nrofSS-BlocksToAverage                INTEGER (2..maxNrofSS-BlocksToAverage)
      OPTIONAL, -- Need R
    absThreshSS-BlocksConsolidation       ThresholdNR
      OPTIONAL, -- Need R
    rangeToBestCell                       RangeToBestCell
      OPTIONAL, -- Need R
    q-Hyst                                ENUMERATED {
                                            dB0, dB1, dB2, dB3, dB4, dB5, dB6,
dB8, dB10,
                                            dB12, dB14, dB16, dB18, dB20, dB22,
dB24},
    speedStateReselectionPars             SEQUENCE {
      mobilityStateParameters               MobilityStateParameters,
      q-HystSF                              SEQUENCE {
        sf-Medium                             ENUMERATED {dB-6, dB-4, dB-2, dB0},
        sf-High                               ENUMERATED {dB-6, dB-4, dB-2, dB0}
      }
    }
      OPTIONAL, -- Need R
    ...
  },
  cellReselectionServingFreqInfo        SEQUENCE {
    s-NonIntraSearchP                     ReselectionThreshold
      OPTIONAL, -- Need R
    s-NonIntraSearchQ                     ReselectionThresholdQ
      OPTIONAL, -- Need R
    threshServingLowP                     ReselectionThreshold,
    threshServingLowQ                     ReselectionThresholdQ
      OPTIONAL, -- Need R
    cellReselectionPriority               CellReselectionPriority,
    cellReselectionSubPriority            CellReselectionSubPriority
      OPTIONAL, -- Need R
    ...
  },
  intraFreqCellReselectionInfo          SEQUENCE {
    q-RxLevMin                            Q-RxLevMin,
    q-RxLevMinSUL                         Q-RxLevMin
      OPTIONAL, -- Need R
```

| SIB2 information element | |
| --- | --- |
| q-QualMin<br>OPTIONAL, -- Need S | Q-QualMin |
| s-IntraSearchP | ReselectionThreshold, |
| s-IntraSearchQ<br>OPTIONAL, -- Cond RSRQ | ReselectionThresholdQ |
| t-ReselectionNR | T-Reselection, |
| frequencyBandList<br>OPTIONAL, -- Need S | MultiFrequencyBandListNR-SIB |
| frequencyBandListSUL<br>OPTIONAL, -- Need R | MultiFrequencyBandListNR-SIB |
| p-Max<br>OPTIONAL, -- Need R | P-Max |
| smtc<br>OPTIONAL, -- Need R | SSB-MTC |
| ss-RSSI-Measurement<br>OPTIONAL, -- Need R | SS-RSSI-Measurement |
| ssb-ToMeasure<br>OPTIONAL, -- Need R | SSB-ToMeasure |
| deriveSSB-IndexFromCell<br>. . . ,<br>[ [ | BOOLEAN, |
| t-ReselectionNR-SF<br>OPTIONAL -- Need N<br>] ]<br>},<br>. . .<br>}<br>RangeToBestCell ::= Q-OffsetRange<br>-- TAG-SIB2-STOP<br>-- ASN1STOP | SpeedStateScaleFactors |

SIB4 contains information relevant only for inter-frequency cell re-selection i.e. information about other NR frequencies and inter-frequency neighbouring cells relevant for cell re-selection. The IE includes cell re-selection parameters common for a frequency as well as cell specific re-selection parameters.

| SIB4 information element | |
| --- | --- |
| -- ASN1START | |
| -- TAG-SIB4-START | |
| SIB4 ::= | SEQUENCE { |
| interFreqCarrierFreqList | InterFreqCarrierFreqList, |
| lateNonCriticalExtension<br>OPTIONAL,<br>. . .<br>} | OCTET STRING |
| InterFreqCarrierFreqList ::=<br>InterFreqCarrierFreqInfo | SEQUENCE (SIZE (1. .maxFreq)) OF |
| InterFreqCarrierFreqInfo ::= | SEQUENCE { |
| dl-CarrierFreq | ARFCN-ValueNR, |
| frequencyBandList<br>OPTIONAL, -- Need S | MultiFrequencyBandListNR-SIB |
| frequencyBandListSUL<br>OPTIONAL, -- Need R | MultiFrequencyBandListNR-SIB |
| nrofSS-BlocksToAverage<br>OPTIONAL, -- Need R | INTEGER (2. .maxNrofSS-BlocksToAverage) |
| absThreshSS-BlocksConsolidation<br>OPTIONAL, -- Need R | ThresholdNR |
| smtc<br>OPTIONAL, -- Need R | SSB-MTC |
| ssbSubcarrierSpacing | SubcarrierSpacing, |
| ssb-ToMeasure<br>OPTIONAL, -- Need R | SSB-ToMeasure |
| deriyeSSB-IndexFromCell | BOOLEAN, |
| ss-RSSI-Measurement<br>OPTIONAL, | SS-RSSI-Measurement |
| q-RxLevMin | Q-RxLevMin, |
| q-RxLevMinSUL<br>OPTIONAL, -- Need R | Q-RxLevMin |
| q-QualMin<br>OPTIONAL, -- Need S, | Q-QualMin |
| p-Max P-Max<br>OPTIONAL, -- Need R | T-Reselection, |
| t-ReselectionNR | |
| t-ReselectionNR-SF | SpeedStateScaleFactors |

| SIB4 information element |
| --- |
| ```
OPTIONAL, -- Need S
  threshX-HighP          ReselectionThreshold,
  threshX-LowP           ReselectionThreshold,
  threshX-Q              SEQUENCE {
    threshX-HighQ          ReselectionThresholdQ,
    threshX-LowQ           ReselectionThresholdQ
  }
OPTIONAL, -- Cond RSRQ
  cellReselectionPriority       CellReselectionPriority
OPTIONAL, -- Need R
  cellReselectionSubPriority    CellReselectionSubPriority
OPTIONAL, -- Need R
  q-OffsetFreq                  Q-OffsetRange
DEFAULT dB0,
  interFreqNeighCellList        InterFreqNeighCellList
OPTIONAL, -- Need R
  interFreqBlackCellList        InterFreqBlackCellList
OPTIONAL, -- Need R
  . . .
}
InterFreqNeighCellList ::=    SEQUENCE (SIZE (1. .maxCellInter)) OF
InterFreqNeighCellInfo
InterFreqNeighCellInfo ::=    SEQUENCE {
  physCellId                    PhysCellId,
  q-OffsetCell                  Q-OffsetRange,
    q-RxLevMinOffsetCell        INTEGER (1. .8)
OPTIONAL, -- Need R
    q-RxLevMinOffsetCellSUL     INTEGER (1. .8)
OPTIONAL, -- Need R
    q-QualMinOffsetCell         INTEGER (1. .8)
OPTIONAL, -- Need R
  . . .
}
InterFreqBlackCellList ::=    SEQUENCE (SIZE (1. .maxCellBlack)) OF PCI-Range
-- TAG-SIB4-STOP
-- ASN1STOP
``` |

According to certain embodiments, a wireless device or UE may be configured to report, to the network, beam measurement information based on beam measurements performed in a dormant state, where the reporting is done upon the transition from a dormant state to connected state.

The reporting of measurement information may be handled by including beam measurements information in the UE Information Response like message, e.g., upon a request from the network. The request may be generic, for measurements performed in idle/inactive, or specific for beam reporting. For example, network may request measurements without beam reporting, or with beam reporting.

The inclusion of beam measurement information in the early measurements upon transition to connected (e.g. to be included in the UE Information Response like message) may be based on the configured parameters (e.g. configured in RRC Release when the UE was suspended). For example, UE may only include the best beam, and/or best beams above a configurable threshold for a given measurement quantity (E.g. RSRP, RSRQ, SINR, etc.).

An implementation in the RRC specifications is provide below, where at least one of the parameters provided in the dedicated configuration controls how the beam measurement information is included in the reports:

5.6.7 UE Information
5.6.7.1 General
. . .
The UE information procedure is used by NG-RAN to request the UE to report information (e.g. cell and beam measurements). 5.6.7.2 Initiation
NG-RAN initiates the procedure by sending the UEInformationRequest message. NG-RAN should initiate this procedure only after successful security activation.

5.6.7.3 Reception of the UEInformationRequest message
Upon receiving the UEInformationRequest message, the UE shall, only after successful security activation:
. . .
1> if the idleModeMeasurementReq is included in the UEInformationRequest and UE has stored VarMeasIdleReport:
  2> set the measResultListIdleInactive in the UEInformationResponse message to the value of idleInactiveMeasReport in the VarMeasIdleInactiveReport;
  2> discard the VarMeasIdleReport upon successful delivery of the UEInformationResponse message confirmed by lower layers;
  2> submit the UEInformationResponse message to lower layers for transmission via SRB1;
1> set rsIndexResults to include up to maxNrofRSIndexesToReport SS/PBCH block indexes or CSI-RS indexes in order of decreasing sorting quantity as follows:
  2> if the measurement information to be included is based on SS/PBCH block:
    3> include within resultsSSB-Indexes the index associated to the best beam for that SS/PBCH block sorting quantity and if absThreshSS-BlocksConsolidation is included in the VarMeasConfig for the measObject associated to the cell for which beams are to be reported, the remaining beams whose sorting quantity is above absThreshSS-BlocksConsolidation;
    3> if includeBeamMeasurements is configured, include the SS/PBCH based measurement results for the quantities in reportQuantityRS-Indexes set to TRUE for each SS/PBCH block-index;
2> else if the beam measurement information to be included is based on CSI-RS:
  3> include within resultsCSI-RS-Indexes the index associated to the best beam for that CSI-RS sorting quantity and, if absThreshCSI-RS-Consolidation is included in the VarMeasConfig for the measObject associated to the cell for which beams are to be reported, the remaining beams whose sorting quantity is above absThreshCSI-RS-Consolidation;
  3> if includeBeamMeasurements is configured, include the CSI-RS based measurement results for the quantities in reportQuantityRS-Indexes set to TRUE for each CSI-RS index.

| UEInformationResponse message |
|---|
| -- ASN1START |
| UEInformationResponse-r16 ::=     SEQUENCE { |
|     rrc-TransactionIdentifier         RRC-TransactionIdentifier, |
|     criticalExtensions               CHOICE { |
|         c1                           CHOICE { |
|             ueInformationResponse-r16     UEInformationResponse-r9-IEs, |
|             spare3 NULL, spare2 NULL, spare1 NULL |
|         }, |
|         criticalExtensionsFuture     SEQUENCE { } |
|     } |
| } |
| UEInformationResponse-r16-IEs ::= SEQUENCE { |
|     measResultListIdle-r15       MeasResultListIdle-r15         OPTIONAL, |
|     . . . |
| } |
| MeasResultListIdleInactiye-r15 ::=  SEQUENCE (SIZE (1. .maxIdleMeasCarriers-r15)) OF MeasResultIdleInactiye-r15 |
| MeasResultIdleInactiye-r15 ::= SEQUENCE { |
|     measResultSeryingCell-r15        SEQUENCE { |
|         resultsSSB-Cell                  MeasQuantityResults     OPTIONAL, |
|         resultsCSI-RS-Cell               MeasQuantityResults     OPTIONAL |
|         rsIndexResults                   SEQUENCE{ |
|             resultsSSB-Indexes               ResultsPerSSB-IndexList   OPTIONAL, |
|             resultsCSI-RS-Indexes            ResultsPerCSI-RS-IndexList   OPTIONAL |
|         } OPTIONAL |
|     }, |
|     measResultNeighCells-r15        CHOICE { |
|         measResultIdleListEUTRA-r15    MeasResultIdleListEUTRA-r15, |
|         measResultIdleListER           MeasResultIdleListNR, |
|         . . . |
|     }                                                                OPTIONAL, |
|     . . . |
| } |
| MeasResultIdleListEUTRA-r15 ::= SEQUENCE (SIZE (1. .maxCellMeasIdle-r15)) OF MeasResultIdleEUTRA-r15 |
| MeasResultIdleListER ::= SEQUENCE (SIZE (1. .maxCellMeasIdle-r15)) OF MeasResultIdleNR-r15 |
| MeasResultIdleNR-r15 ::= SEQUENCE { |
|     ssbFrequency                 ARFCN-ValueNR                    OPTIONAL, |
|     physCellId                   PhysCellId OPTIONAL, |
|     measResult                   SEQUENCE { |
|         cellResults                  SEQUENCE{ |
|             resultsSSB-Cell              MeasQuantltyResults        OPTIONAL, |
|             resultsCSI-RS-Cell           MeasQuantltyResults        OPTIONAL |
|         }, |
|         rsIndexResults               SEQUENCE{ |
|             resultsSSB-Indexes           ResultsPerSSB-IndexList    OPTIONAL, |
|             resultsCSI-RS-Indexes        ResultsPerCSI-RS-IndexList   OPTIONAL |
|         } OPTIONAL |
|     }, |
|     . . . |
| } |
| MeasResultIdleEUTRA-r15 ::= SEQUENCE { |
|     carrierFreq-r15              ARECN-ValueEUTRA-r9, |
|     physCellId-r15               PhysCellId, |
|     measResult-r15               SEQUENCE { |
|         rsrpResult-r15               RSRP-Range, |
|         rsrgResult-r15               RSRQ-Range-r13 |
|     }, |
|     . . . |

| UEInformationResponse message | |
|---|---|
| }
MeasQuantltyResults ::=
   rsrp
   rsrq
   sinr
}
MeasQuantltyResultsEUTRA ::=
   rsrp
   rsrq
   sinr
}
ResultsPerSSB-IndexList::=
OF ResultsPerSSB-Index
ResultsPerSSB-Index ::=
   ssb-Index
   ssb-Results
}
ResultsPerCSI-RS-IndexList::=
OF ResultsPerCSI-RS-Index
ResultsPerCSI-RS-Index ::=
   csi-RS-Index
   csi-RS-Results
OPTIONAL
}
-- ASN1STOP | SEQUENCE {
   RSRP-Range           OPTIONAL,
   RSRQ-Range          OPTIONAL,
   SINR-Range           OPTIONAL SEQUENCE {
   RSRP-RangeEUTRA   OPTIONAL,
   RSRQ-RangeEUTRA   OPTIONAL,
   SINR-RangeEUTRA   OPTIONAL SEQUENCE (SIZE (1. .maxNrofIndexesToReport2))

SEQUENCE {
   SSB-Index,
   MeasQuantityResults  OPTIONAL

SEQUENCE (SIZE (1. .maxNrofIndexesToReport2))

SEQUENCE {
   CSI-RS-Index,
   MeasQuantityResults |

| VarMeasIdleReport UE variable |
|---|
| -- ASN1START
VarMeasIdleInactiveReport ::=   SEQUENCE {
   measReportIdleInactive      MeasResultListIdleInactive
}
-- ASN1STOP |

Figure 11:
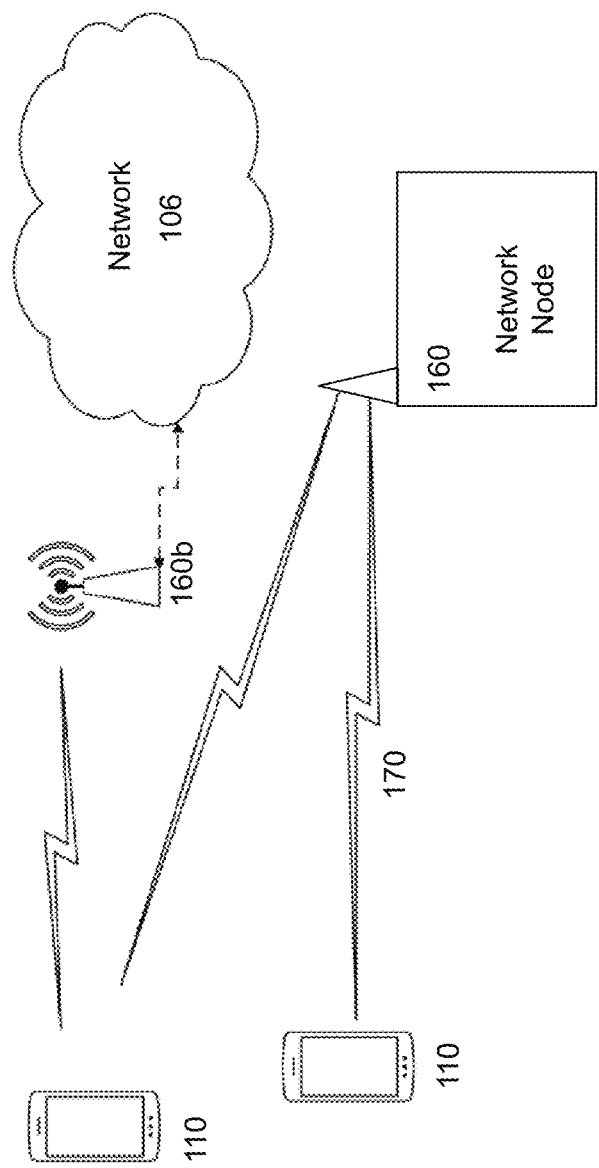
FIG. 11 illustrates an example wireless network, according to certain embodiments.

FIG. 11 illustrates an example wireless network in accordance with some embodiments. Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 12:
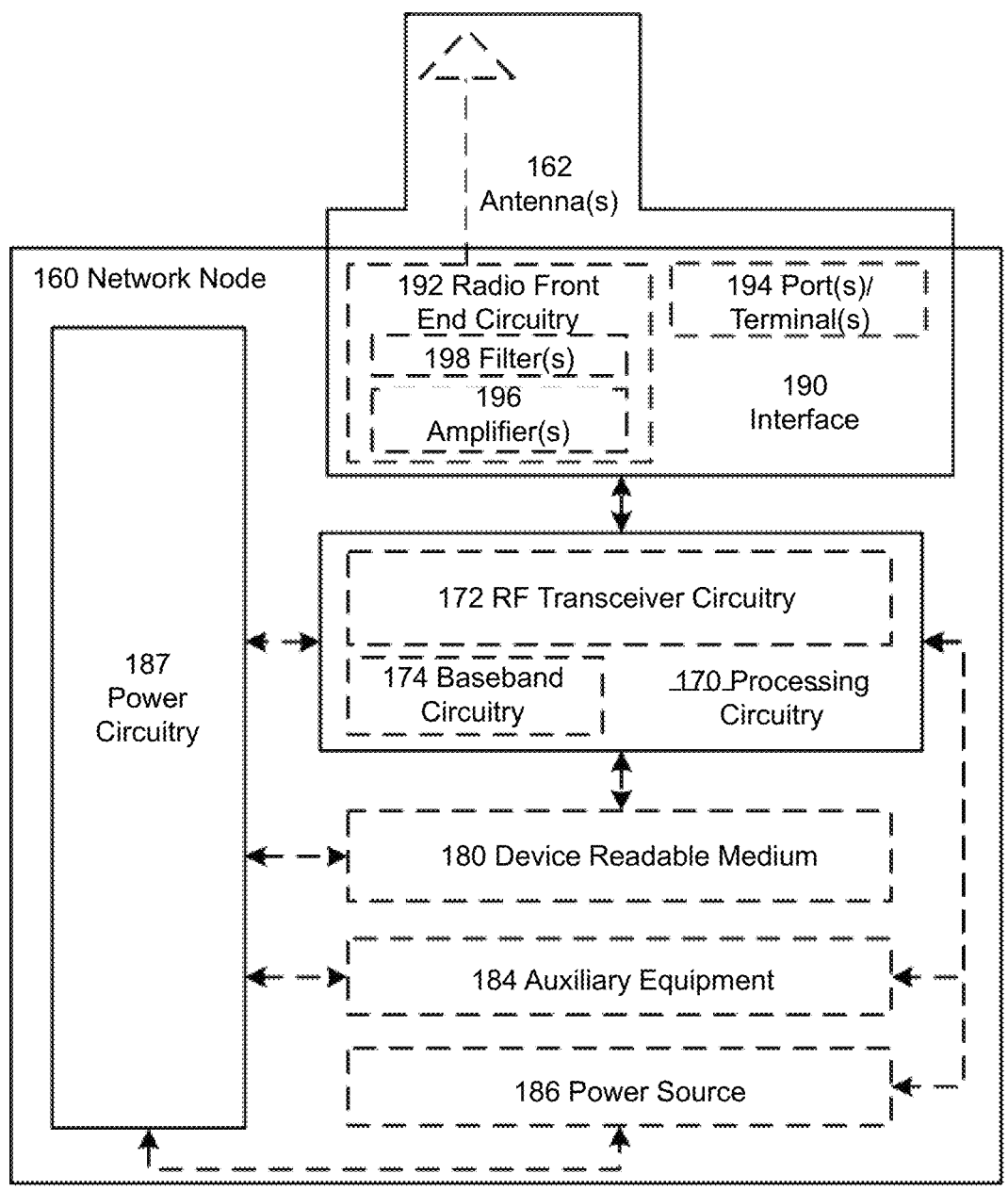
FIG. 12 illustrates an example network node, according to certain embodiments.

FIG. 12 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all)

parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 160 includes processing circuitry 170, device readable medium 180, interface 190, auxiliary equipment 184, power source 186, power circuitry 187, and antenna 162. Although network node 160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 12 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 13:
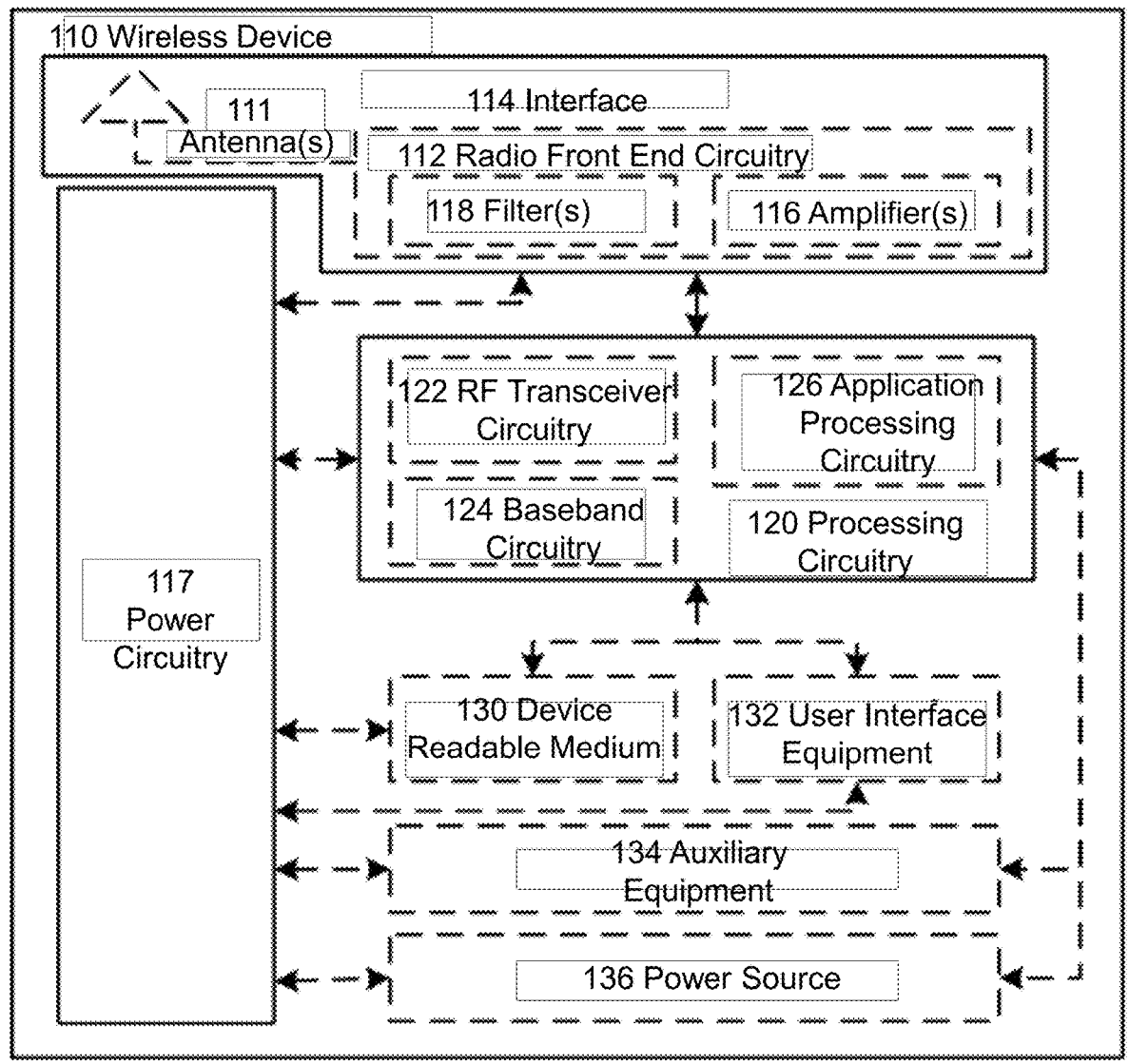
FIG. 13 illustrates an example wireless device, according to certain embodiments.

FIG. 13 illustrates an example wireless device 110, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 14:
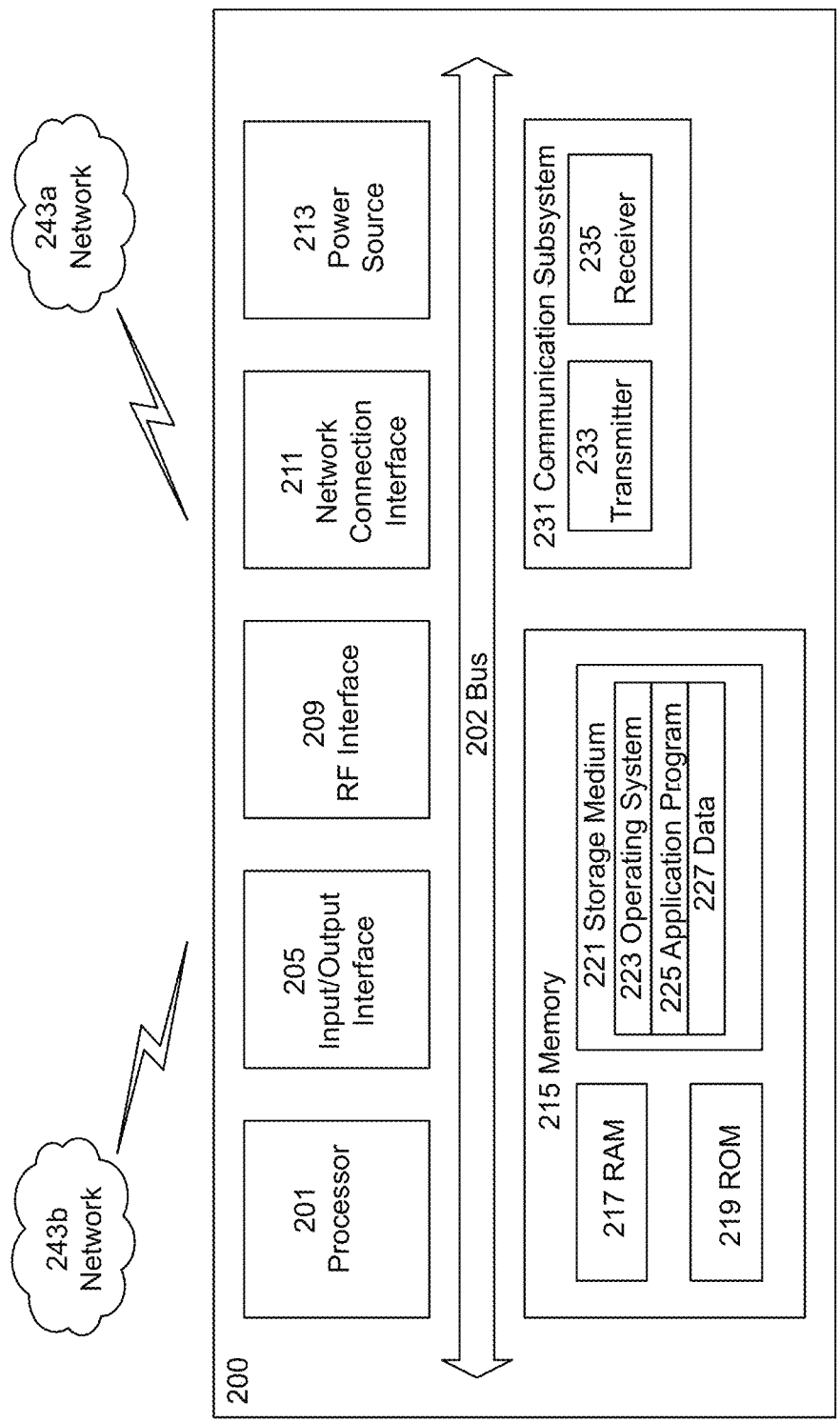
FIG. 14 illustrate an example user equipment, according to certain embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 14, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 14 is a UE, the components discussed herein are equally applicable to a wireless device, and vice-versa.

In FIG. 14, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 14, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 15:
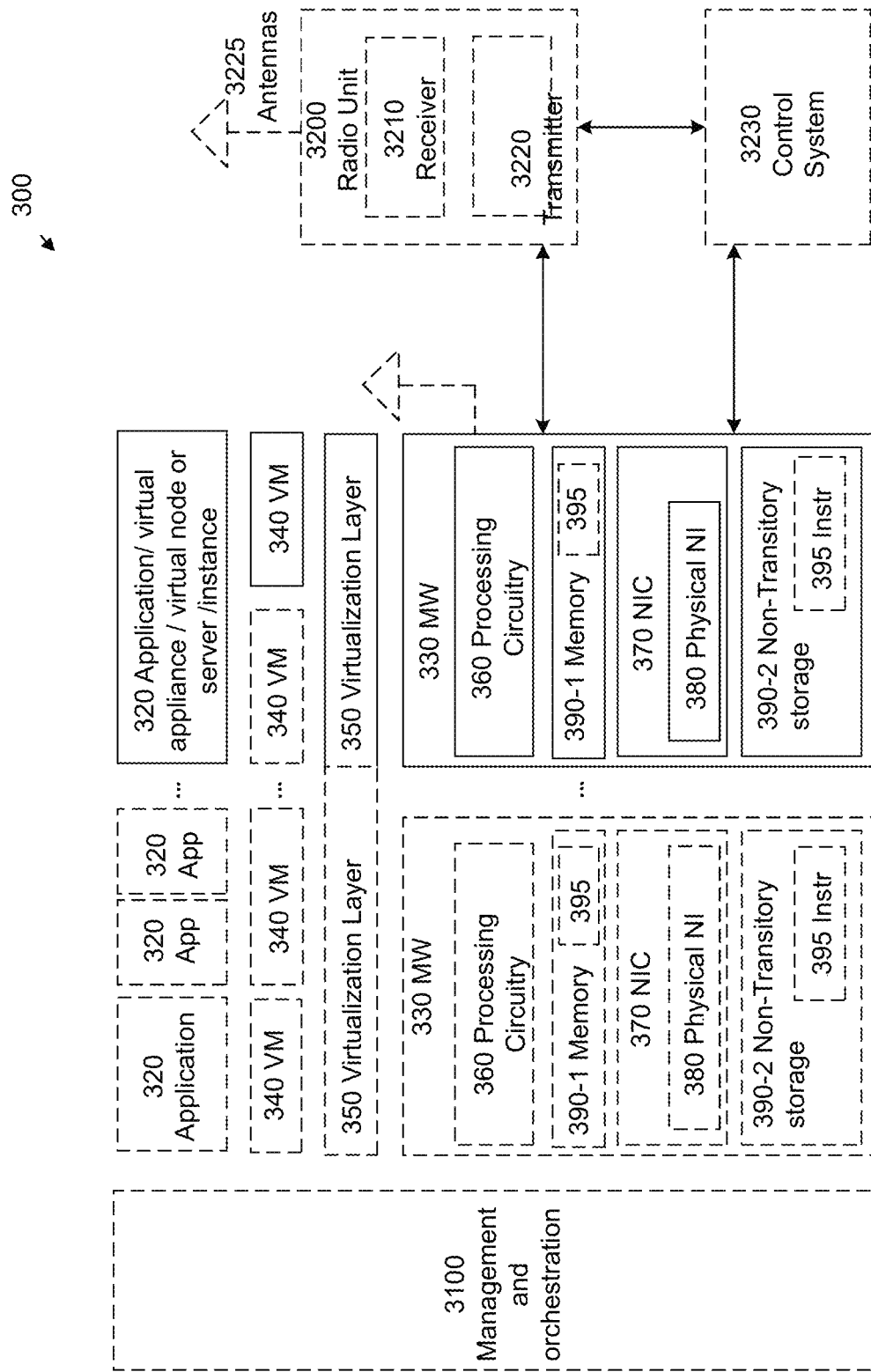
FIG. 15 illustrates a virtualization environment in which functions implemented by some embodiments may be virtualized, according to certain embodiments.

FIG. 15 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 15, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 15.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 16:
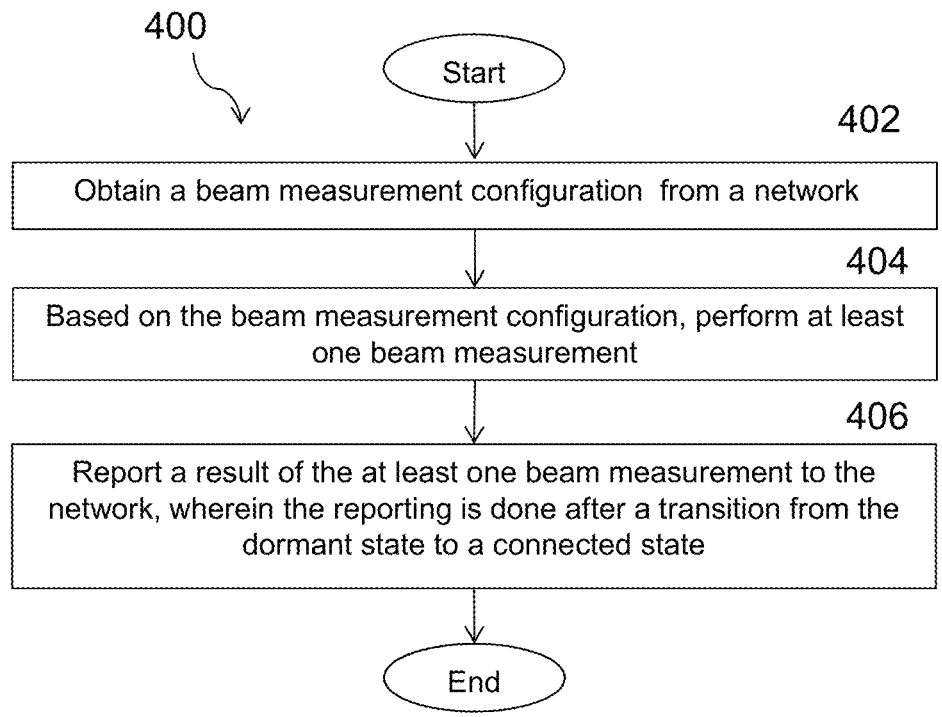
FIG. 16 illustrates an example method by a wireless device, according to certain embodiments.

FIG. 16 illustrates an exemplary method 400 for measurement reporting performed by a wireless device 110, in accordance with certain embodiments. The method begins at step 402 when wireless device 110 obtains a beam measurement configuration from a network. At step 404, based on the beam measurement configuration, wireless device 110 performs at least one beam measurement while operating in a dormant state. At step 406, wireless device 110 reports a result of the at least one beam measurement to the network. The reporting is done after a transition from the dormant state to a connected state.

In a particular embodiment, the dormant state includes one of a RRC_IDLE with stored context, RRC_IDLE without stored context state, or RRC_INACTIVE state.

In a particular embodiment, the at least one beam measurement includes at least one measurement performed on at least one reference signal that is beamformed by the network. The at least one reference signal includes at least one of a SSB and a CSI-RS resource.

In a particular embodiment, the at least one beam measurement comprises at least one of: a RSRP, RSRQ, or SINR.

In a particular embodiment, the result of the at least one beam measurement is reported in a RadioResourceControlResumeComplete message.

In a particular embodiment, the result of the at least one beam measurement is reported in a UEInformationResponse message.

In a particular embodiment, obtaining the beam measurement configuration includes receiving a message comprising the beam measurement configuration. The message indicates that the wireless device is to transition to the dormant state.

In a particular embodiment, performing the at least one beam measurement while operating in the dormant state includes performing the at least one beam measurement on a per cell and/or per carrier frequency while in the dormant state.

In a particular embodiment, performing the at least one beam measurement while operating in the dormant state includes performing the at least one beam measurement on at least one cell or carrier having SSBs outside a sync raster while in the dormant state. Stated differently, the beam measurements are performed outside the sync raster.

In a particular embodiment, the beam measurement configuration is obtained from a source network node, and the reporting of the result of the at least one beam measurement is transmitted to a target network node that is different from a source node.

In a particular embodiment, the beam measurement configuration is obtained from a network node, and the reporting of the result of the at least one beam measurement is transmitted to the network node. In this scenario, the network node is a source network node.

Figure 17:
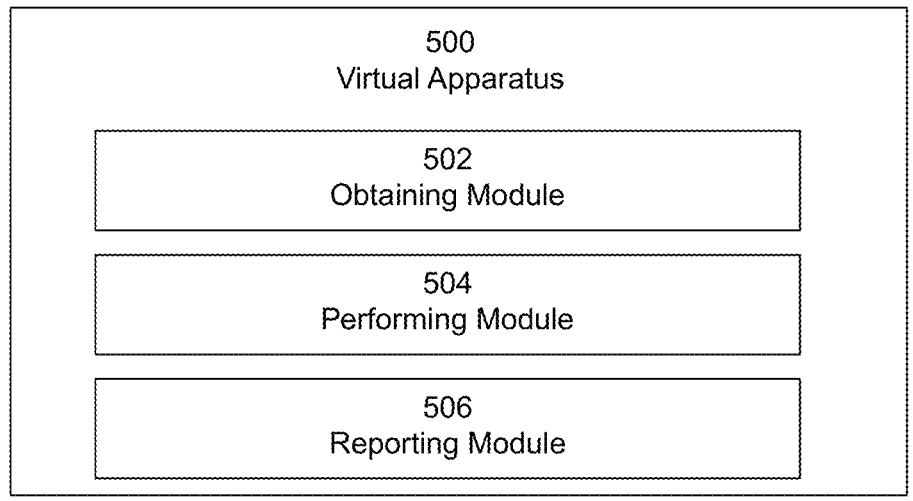
FIG. 17 illustrates an exemplary virtual computing device, according to certain embodiments.

In certain embodiments, the method measurement reporting as described above may be performed by a virtual computing device. FIG. 17 illustrates an example virtual computing device 500 for measurement reporting, according to certain embodiments. In certain embodiments, virtual computing device 500 may include modules for performing steps similar to those described above with regard to the method illustrated and described in FIG. 16. For example, virtual computing device 500 may include a obtaining module 502, a performing module 504, a reporting module 506, and any other suitable modules for measurement reporting. In some embodiments, one or more of the modules may be implemented using processing circuitry 120 of FIG. 13. In certain embodiments, the functions of two or more of the various modules may be combined into a single module.

The obtaining module 502 may perform the obtaining functions of virtual computing device 500. For example, in a particular embodiment, obtaining module 502 may obtain a beam measurement configuration from a network.

The performing module 504 may perform the performing functions of virtual computing device 500. For example, in a particular embodiment, based on the beam measurement configuration, performing module 504 may perform at least one beam measurement while operating in a dormant state.

The reporting module 506 may perform the reporting functions of virtual computing device 500. For example, in a particular embodiment, reporting module 506 may report a result of the at least one beam measurement to the network. The reporting is done after a transition from the dormant state to a connected state.

Other embodiments of virtual computing device 500 may include additional components beyond those shown in FIG. 17 that may be responsible for providing certain aspects of the wireless device's functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 18:
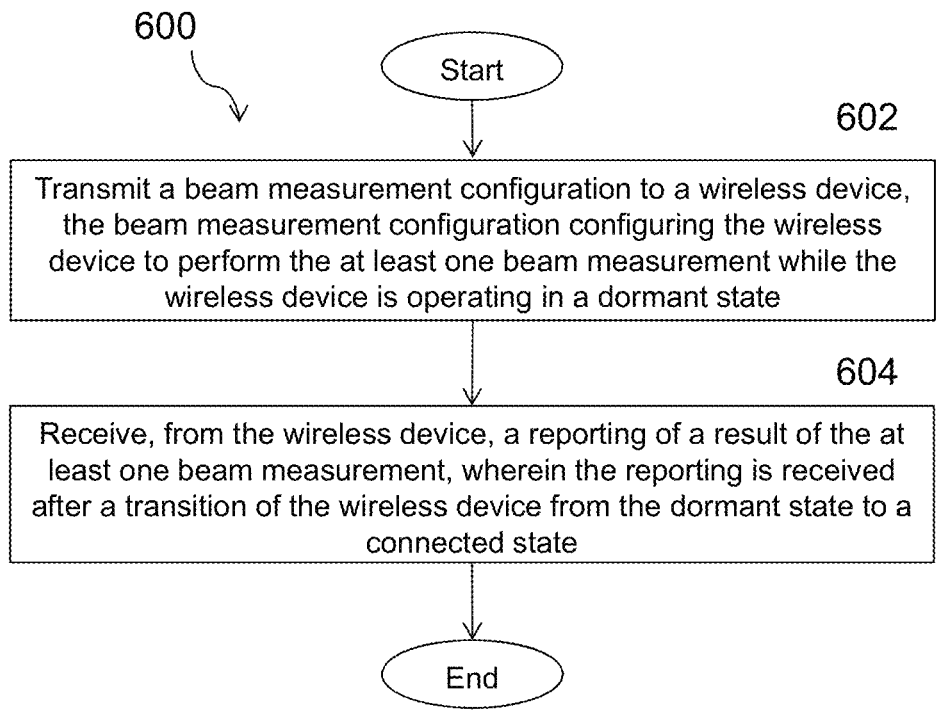
FIG. 18 illustrates an example method by a network node, according to certain embodiments.

FIG. 18 illustrates an example method 600 by a network node 115 such as for example, a base station, for configuring measurement reporting, according to certain embodiments. The method begins at step 602 when the base station transmits a beam measurement configuration to a wireless device. The beam measurement configuration configures the wireless device to perform the at least one beam measurement while the wireless device is operating in a dormant state. At step 604, the base station receives, from the wireless device, a reporting of a result of the at least one beam measurement. The reporting is received after a transition of the wireless device from the dormant state to a connected state.

In a particular embodiment, the dormant state comprises one of: A RRC_IDLE with stored context state, a RRC_IDLE without stored context state, or a RRC_INACTIVE state.

In a particular embodiment, the at least one beam measurement includes at least one measurement performed on at least one reference signal that is beamformed by the network. The at least one reference signal includes at least one of a SSB and a CSI-RS resource.

In a particular embodiment, the at least one beam measurement includes at least one of RSRP, RSRQ, and SINR.

In a particular embodiment, the result of the at least one beam measurement is received in a RRCResumeComplete message.

In a particular embodiment, the result of the at least one beam measurement is reported in a UEInformationResponse message.

In a particular embodiment, the beam measurement configuration message indicates that the wireless device is to transition to the dormant state.

In a particular embodiment, the beam measurement configuration message configures the wireless device 110 to perform the at least one beam measurement on a per cell and/or per carrier frequency while in the dormant state.

In a particular embodiment, the beam measurement configuration message configures the wireless device 110 to perform the at least one beam measurement on at least one cell or carrier having SSB outside a sync raster while in the dormant state. Stated differently, the beam measurement configuration message configures the wireless device 110 to perform the beam measurements outside the sync raster.

In a particular embodiment, the base station transmits, to the wireless device 110, contention free Radio Access Channel, RACH, resources for at least one beam included in the reporting of the result of the at least one beam measurement.

Figure 19:
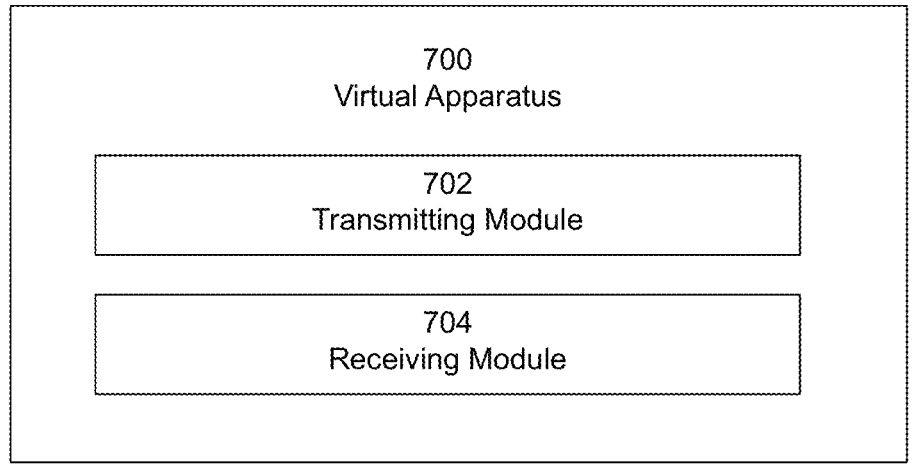
FIG. 19 illustrates another exemplary virtual computing device 1, according to certain embodiments.

In certain embodiments, the method for configuring measurement reporting as described above may be performed by a virtual computing device. FIG. 19 illustrates an example virtual computing device 700 for configuring measurement reporting, according to certain embodiments. In certain embodiments, virtual computing device 700 may include modules for performing steps similar to those described above with regard to the method illustrated and described in FIG. 18. For example, virtual computing device 700 may include at least one transmitting module 702, a receiving module 704, and any other suitable modules for configuring measurement reporting. In some embodiments, one or more of the modules may be implemented using processing circuitry 170 of FIG. 12. In certain embodiments, the functions of two or more of the various modules may be combined into a single module.

The transmitting module 702 may perform the transmitting functions of virtual computing device 700. For example, in a particular embodiment, transmitting module 702 may transmit a beam measurement configuration to a wireless device 110. The beam measurement configuration configures the wireless device 110 to perform the at least one beam measurement while the wireless device 110 is operating in a dormant state.

The receiving module 704 may perform the receiving functions of virtual computing device 700. For example, in a particular embodiment, receiving module 704 may receive, from the wireless device 110, a reporting of a result of the at least one beam measurement. The reporting is received after a transition of the wireless device 110 from the dormant state to a connected state.

Other embodiments of virtual computing device 700 may include additional components beyond those shown in FIG. 12 that may be responsible for providing certain aspects of the network node's functionality, including any of the functionality described above and/or any additional functionality (including any functionality necessary to support the solutions described above). The various different types of wireless devices 115 may include components having the same physical hardware but configured (e.g., via programming) to support different radio access technologies, or may represent partly or entirely different physical components.

The invention claimed is:

1. A method for measurement reporting performed by a wireless device, the method comprising:
    receiving, from a network, a message indicating that the wireless device is to transition from a Radio Resource Control connected (RRC_CONNECTED) state to a Radio Resource Control Idle (RRC_IDLE) or Radio Resource Control Inactive (RRC_INACTIVE) state, the message comprising a beam measurement configuration, the beam measurement configuration comprising a list of beams;
    based on the beam measurement configuration comprising the list of beams, performing at least one beam measurement while operating in the RRC_IDLE or RRC_INACTIVE state;
    transitioning from the RRC_IDLE or RRC_INACTIVE state to the RRC_CONNECTED state; and
    reporting a result of the at least one beam measurement to the network while in the RRC_CONNECTED state.

2. The method of claim 1, wherein the at least one beam measurement comprises at least one measurement performed on at least one reference signal that is beamformed by the network, the at least one reference signal comprising a Synchronization Signal Block (SSB).

3. The method of claim 1, wherein the at least one beam measurement comprises at least one of:
    Reference Signal Received Power, RSRP; and
    Reference Signal Received Quality, RSRQ.

4. The method of claim 1, wherein the result of the at least one beam measurement is reported in a RRCResumeComplete message.

5. The method of claim 1, wherein the result of the at least one beam measurement is reported in a UEInformationResponse message.

6. The method of claim 1, wherein the message comprises a RRCRelease message.

7. The method of claim 1, wherein performing the at least one beam measurement while operating in the RRC_IDLE or RRC_INACTIVE state comprises performing the at least one beam measurement on a per cell and/or per carrier frequency while in the RRC_IDLE or RRC_INACTIVE state.

8. A wireless device comprising:
    processing circuitry configured to:
    receive, from a network, a message indicating that the wireless device is to transition from a Radio Resource Control connected (RRC_CONNECTED) state to a Radio Resource Control Idle (RRC_IDLE) or Radio Resource Control Inactive (RRC_INACTIVE) state, the message comprising a beam measurement configuration, the beam measurement configuration comprising a list of beams;
    based on the beam measurement configuration comprising the list of beams, perform at least one beam measurement while operating in the RRC_IDLE or RRC_INACTIVE state;

transition from the RRC_IDLE or RRC_INACTIVE state to the RRC_CONNECTED state; and report a result of the at least one beam measurement to the network while in the RRC_CONNECTED state.

9. The wireless device of claim 8, wherein the at least one beam measurement comprises at least one measurement performed on at least one reference signal that is beamformed by the network, the at least one reference signal comprising a Synchronization Signal Block (SSB).

10. The wireless device of claim 8, wherein the at least one beam measurement comprises at least one of:
Reference Signal Received Power, RSRP; and
Reference Signal Received Quality, RSRQ.

11. The wireless device of claim 8, wherein the result of the at least one beam measurement is reported in a RRCResumeComplete message or a UEInformationResponse message.

12. The wireless device of claim 8, wherein the message comprises a RRCRelease message.

13. A method performed by a base station for configuring measurement reporting, the method comprising:
transmitting, to a wireless device, a message indicating that the wireless device is to transition from a Radio Resource Control connected (RRC_CONNECTED) state to a Radio Resource Control Idle (RRC_IDLE) or Radio Resource Control Inactive (RRC_INACTIVE) state, the message comprising a beam measurement configuration configuring the wireless device to perform at least one beam measurement while the wireless device is operating in the RRC_IDLE or RRC_INACTIVE state, the beam measurement configuration comprising a list of beams;
receiving, from the wireless device, a reporting of a result of the at least one beam measurement, wherein the reporting is received after a first transition of the wireless device from the RRC_CONNECTED state to the RRC_IDLE or RRC_INACTIVE state and after a second transition of the wireless device from the RRC_IDLE or RRC_INACTIVE state to the RRC_CONNECTED state.

14. A base station comprising:
processing circuitry configured to:
transmit, to a wireless device, a message indicating that the wireless device is to transition from a Radio Resource Control connected (RRC_CONNECTED) state to a Radio Resource Control Idle (RRC_IDLE) or Radio Resource Control Inactive (RRC_INACTIVE) state, the message comprising a beam measurement configuration configuring the wireless device to perform at least one beam measurement while the wireless device is operating in the RRC_IDLE or RRC_INACTIVE state, the beam measurement configuration comprising a list of beams;
receive, from the wireless device, a reporting of a result of the at least one beam measurement, wherein the reporting is received after a first transition of the wireless device from the RRC_CONNECTED state to the RRC_IDLE or RRC_INACTIVE state and after a second transition of the wireless device from the RRC_IDLE or RRC_INACTIVE state to the RRC_CONNECTED state.

15. The base station of claim 14, wherein the at least one beam measurement comprises at least one measurement performed on at least one reference signal that is beamformed by the network, the at least one reference signal comprising a Synchronization Signal Block (SSB).

16. The base station of claim 14, wherein the at least one beam measurement comprises at least one of:
Reference Signal Received Power, RSRP; and
Reference Signal Received Quality, RSRQ.

17. The base station of claim 16, wherein the result of the at least one beam measurement is received in a RRCResumeComplete message.

18. The base station of claim 16, wherein the result of the at least one beam measurement is reported in a UEInformationResponse message.

19. The base station of claim 14, wherein the message comprises a RRCRelease message.

20. The base station of claim 14, wherein the message configures the wireless device to perform the at least one beam measurement on a per cell and/or per carrier frequency while in the RRC_IDLE or RRC_INACTIVE state.

* * * * *